US012747483B2

(12) United States Patent
Ueda et al.

(10) Patent No.: US 12,747,483 B2
(45) Date of Patent: Sep. 29, 2026

(54) WELDED RAIL

(71) Applicant: NIPPON STEEL CORPORATION, Tokyo (JP)

(72) Inventors: Masaharu Ueda, Tokyo (JP); Kenji Saita, Tokyo (JP); Teruhisa Miyazaki, Tokyo (JP); Takuya Tanahashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 367 days.

(21) Appl. No.: 18/693,321

(22) PCT Filed: Nov. 1, 2022

(86) PCT No.: PCT/JP2022/040876

§ 371 (c)(1),
(2) Date: Mar. 19, 2024

(87) PCT Pub. No.: WO2023/080135

PCT Pub. Date: May 11, 2023

(65) Prior Publication Data

US 2025/0129460 A1 Apr. 24, 2025

(30) Foreign Application Priority Data

Nov. 5, 2021 (JP) ................................ 2021-181221

(51) Int. Cl.
*C21D 9/04* (2006.01)
*B23K 11/04* (2006.01)
(Continued)

(52) U.S. Cl.
CPC ................ *C21D 9/04* (2013.01); *B23K 11/04* (2013.01); *B23K 13/00* (2013.01); *C21D 9/50* (2013.01);
(Continued)

(58) Field of Classification Search
CPC ... C21D 9/04; C21D 9/50; C21D 8/00; C21D 2211/009; E01B 11/44; E01B 29/42;
(Continued)

(56) References Cited

U.S. PATENT DOCUMENTS 7,972,451 B2 * 7/2011 Ueda ...................... C22C 38/02 148/333
8,469,284 B2 * 6/2013 Ueda ...................... C22C 38/04 238/150
(Continued)

FOREIGN PATENT DOCUMENTS

JP 2004-043862 A 2/2004
JP 2007-289970 A 11/2007
(Continued)

*Primary Examiner* — Zachary L Kuhfuss
(74) *Attorney, Agent, or Firm* — Rabin & Berdo, P.C.

(57) ABSTRACT

A welded rail having excellent fatigue damage resistance and breakage resistance of a welded joint portion according to an aspect of the present invention includes: a plurality of rail portions; and a welded joint portion joining the rail portions, in which a HAZ width (W) is 60 mm or less, and when an interval between a most softened portion and a welding center measured along a longitudinal direction is defined as WX and a region where the distance from the welding center is 0.6 WX to 0.7 WX and the depth from a top portion outer surface is 2 to 5 mm is defined as a pro-eutectoid cementite structure evaluation region, in the pro-eutectoid cementite structure evaluation region, a total number of intersections (N) of a pro-eutectoid cementite structure intersecting a cross line including two line segments having a length of 100 μm parallel to the longitudinal direction and the vertical direction is 26 or less.

2 Claims, 10 Drawing Sheets

(51) Int. Cl.

| | |
|---|---|
| ***B23K 13/00*** | (2006.01) |
| ***C21D 9/50*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/08*** | (2006.01) |
| ***C22C 38/12*** | (2006.01) |
| ***C22C 38/14*** | (2006.01) |
| ***C22C 38/16*** | (2006.01) |
| ***C22C 38/20*** | (2006.01) |
| ***C22C 38/22*** | (2006.01) |
| ***C22C 38/24*** | (2006.01) |
| ***C22C 38/26*** | (2006.01) |
| ***C22C 38/28*** | (2006.01) |
| ***C22C 38/30*** | (2006.01) |
| ***C22C 38/32*** | (2006.01) |
| ***C22C 38/38*** | (2006.01) |
| ***C22C 38/40*** | (2006.01) |
| ***C22C 38/58*** | (2006.01) |
| ***E01B 11/44*** | (2006.01) |
| ***E01B 29/42*** | (2006.01) |
| *B23K 101/26* | (2006.01) |
| *C21D 8/00* | (2006.01) |
| *E01B 11/50* | (2006.01) |
| *E01B 29/44* | (2006.01) |

(52) U.S. Cl.

CPC ............ *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C22C 38/38* (2013.01); *C22C 38/40* (2013.01); *C22C 38/58* (2013.01); *E01B 11/44* (2013.01); *E01B 29/42* (2013.01); *B23K 2101/26* (2018.08); *C21D 8/00* (2013.01); *C21D 2211/009* (2013.01); *E01B 11/50* (2013.01); *E01B 29/44* (2013.01)

(58) Field of Classification Search

CPC ......... E01B 11/50; E01B 29/44; B23K 11/04; B23K 13/00; B23K 2101/26; C22C 38/00; C22C 38/001; C22C 38/002; C22C 38/005; C22C 38/02; C22C 38/04; C22C 38/06; C22C 38/08; C22C 38/12; C22C 38/14; C22C 38/16; C22C 38/20; C22C 38/22; C22C 38/24; C22C 38/26; C22C 38/28; C22C 38/30; C22C 38/32; C22C 38/38; C22C 38/40; C22C 38/58

See application file for complete search history.

(56) References Cited

U.S. PATENT DOCUMENTS

| | | | | |
|---|---|---|---|---|
| 9,617,690 | B2 * | 4/2017 | Saita | B23K 11/04 |
| 10,544,479 | B2 * | 1/2020 | Karimine | C21D 9/50 |
| 10,563,357 | B2 * | 2/2020 | Ueda | C21D 9/04 |
| 10,851,436 | B2 * | 12/2020 | Lehnhoff | C22C 38/04 |
| 12,247,358 | B2 * | 3/2025 | Ueda | C22C 38/02 |
| 2004/0187981 | A1 * | 9/2004 | Ueda | C22C 38/02 148/333 |
| 2008/0011393 | A1 * | 1/2008 | Ueda | C22C 38/02 148/584 |
| 2012/0234806 | A1 * | 9/2012 | Saita | E01B 29/42 219/121.64 |
| 2014/0087320 | A1 * | 3/2014 | Karimine | C21D 9/04 432/9 |
| 2017/0073793 | A1 * | 3/2017 | Karimine | C21D 1/42 |
| 2018/0016654 | A1 * | 1/2018 | Pyke | C21D 8/02 |
| 2019/0100822 | A1 * | 4/2019 | Lehnhoff | C21D 6/004 |
| 2022/0064746 | A1 * | 3/2022 | Bai | B23K 35/3053 |
| 2023/0193438 | A1 * | 6/2023 | Ueda | C22C 38/54 238/164 |

FOREIGN PATENT DOCUMENTS

| | | | | |
|---|---|---|---|---|
| WO | 2011/052562 | A1 | 5/2011 | |
| WO | WO-2014081246 | A1 * | 5/2014 | C22C 38/58 |

* cited by examiner

WELDED RAIL

TECHNICAL FIELD OF THE INVENTION

The present invention relates to a welded rail.

The present application claims priority based on Japanese Patent Application No. 2021-181221 filed in Japan on Nov. 5, 2021, the contents of which are incorporated herein by reference.

RELATED ART

Flash butt welding is widely used as a rail welding method. As features of flash butt welding, it is known that automation is possible, quality stability is high, and welding time is short.

Flash butt welding is a technique in which rail end surfaces are melted by heating, and then the melted surfaces are brought into pressure contact with each other to join the rails to each other. During flash butt welding, the rails are heated from room temperature to near their maximum melting point and then cooled. Therefore, the metallographic structure and hardness of the rail are changed by flash butt welding. A portion where metallurgical properties, mechanical properties, and the like are changed by heat such as welding and cutting is called a heat affected zone (HAZ).

In the HAZ, austenitization and pearlitic transformation of the metallographic structure of the rail portion accompanied by heating to the A1 point or more during welding, and partial austenitization of the metallographic structure of the rail portion and decomposition of the pearlite structure accompanied by heating to the vicinity of the A1 point occur. This causes a decrease in hardness in HAZ.

When the hardness is reduced in the welded rail, the wear of the HAZ of the rail head portion is promoted by the passage of the wheel. Then, due to the difference in the wear rate between the HAZ and the base material, unevenness is likely to occur in the welded joint portion. For this reason, an excessive load acts on the welded joint portion during traveling of a train, and the possibility of breakage or the like of the welded rail increases.

Therefore, in flash butt welding of rails, it is required to suppress softening of the HAZ of the welded joint portion. For example, the following technique has been proposed for suppressing HAZ softening.

Patent Document 1 discloses that in order to reduce the HAZ width in the rail longitudinal direction in the flash welding of a rail, a patch having a length of 15 mm or more in the rail longitudinal direction on the head top surface and a thickness of 10 mm or more at a portion in contact with the head top surface is set within a range of 20 mm or more and 50 mm or less from the rail end surface before welding, and then the rail is flash butt welded, so that the softening of the HAZ of the welded joint whose hardness decreases, that is, the width (HAZ width) of the softened region of the HAZ in the rail longitudinal direction can be set to 15 mm or less.

Patent Document 2 discloses that in order to reduce a HAZ width in a rail longitudinal direction in the flash welding of a rail, a flash butt welding method for achieving a rail welded joint in which a late flashing speed is set to 2.1 mm/sec or more, a HAZ width is set to 27 mm or less, and a softening width is set to 10 mm or less.

Patent Document 3 describes a heat treatment method for a welded joint portion in which, in rail welding, any one or both of a rail head portion and a base portion heated to a range of 800 to 900° C. in a two-phase state in which an austenite phase and a cementite phase are mixed are accelerated and cooled from a temperature range of 750° C. or higher at a cooling rate of 1 to 10° C./sec, accelerated cooling is stopped when the temperature of any one or both of the head portion and the base portion of the steel rail reaches 680 to 550° C., and thereafter, one or both of them are air cooled or slowly cooled so as not to exceed 680° C., formation of pro-eutectoid cementite structure is suppressed, and the toughness of a rail welded joint portion is improved.

CITATION LIST

Patent Document

[Patent Document 1]
Japanese Unexamined Patent Application, First Publication No. 2007-289970

[Patent Document 2]
PCT International Publication No. WO 2011/052562

[Patent Document 3]
Japanese Unexamined Patent Application, First Publication No. 2004-43862

SUMMARY OF INVENTION

Problems to be Solved by the Invention

However, the fatigue damage resistance and breakage resistance required for the welded rail are increasing. The technique of Patent Document 1 to 3 has problems as described below.

In the method of attaching a patch as in Patent Document 1, it is necessary to attach a separately prepared patch within a specified range. However, the location where the patch is disposed is extremely close to the abutting end surface of the rail. As a result, the molten metal scattered during the flash butt welding is fixed to the patch. Therefore, in the method of Patent Document 1, attachment and detachment of the patch is not easy, and it takes time and effort to remove the metal fixed to the patch. Therefore, the method of Patent Document 1 has room for further improvement in work efficiency.

In addition, a main object of the technology described in Patent Document 1 is to suppress softening of the HAZ portion of the welded joint portion, to reduce uneven wear of the rail, to suppress noise and vibration of the train, to reduce impact on the rail when the vehicle passes, and to suppress fatigue fracture of the rail. However, the track environment has become severe due to high loading of a freight car in recent years. Accordingly, damage caused by fatigue fracture occurring at the base portion of the welded joint portion and breakage caused by brittle fracture occurring at the head portion frequently occur. The technique described in Patent Document 1 is considered to have an effect of suppressing fatigue fracture by reducing uneven wear generated at the head portion of the welded joint portion. However, in the technique described in Patent Document 1, it is not assumed that breakage caused by brittle fracture and fatigue fracture occurring under a severe use environment as described above is prevented. In the technique described in Patent Document 1, there is room for further improving the use performance of the welded rail.

The main object of the technique described in Patent Document 2 is to reduce the heat affected zone of the weld of the high carbon hypereutectoid rail steel, to reduce the unevenness of the welded joint portion due to wear, and to reduce uneven wear and surface damage of the rail head portion. However, the track environment has become severe due to high loading of a freight car in recent years, and accordingly, damage caused by fatigue fracture occurring at the base portion of the welded joint portion and breakage caused by brittle fracture occurring at the head portion frequently occur. The technique described in Patent Document 2 is considered to have an effect of reducing uneven wear and surface damage of the rail head portion under such a severe use environment. However, in the technique described in Patent Document 2, it is not assumed that breakage of the welded joint portion caused by brittle fracture and fatigue fracture occurring under a severe use environment as described above is prevented. In the technique described in Patent Document 2, there is room for further improving the use performance of the welded rail.

In addition, there is a problem that in a rail of hypereutectoid component (C: 0.80% or more), a pro-eutectoid cementite structure having low toughness is easily formed in a welded joint portion, and the possibility of breakage of the rail or the like increases. The main object of the technique described in Patent Documents 1 and 2 are to reduce the unevenness of the welded joint portion due to wear and suppressing uneven wear of the head portion, surface damage, and fatigue fracture of the welded joint portion, but a rail of a hypereutectoid component is not considered. It is not an object in Patent Documents 1 and 2 to suppress the formation of pro-eutectoid cementite structure that reduces the toughness of the welded joint portion and to improve the breakage resistance of the welded joint portion, which is a problem in the rail of a hypereutectoid component. In addition, when the techniques of Patent Documents 1 and 2 are applied to rails of a hypereutectoid component, it is considered that breakage resistance is not sufficient.

An object of the technique described in Patent Document 3 is to suppress the formation of pro-eutectoid cementite structure that reduces the toughness of the welded joint portion and to improve the breakage resistance of the welded joint portion. The technique described in Patent Document 3 is directed to the rail of a hypereutectoid component.

However, the track environment has become severe due to high loading of freight cars in recent years, and breakage caused by brittle fracture occurring at the head portion of the welded joint portion frequently occurs accordingly. In the technique described in Patent Document 3, it is considered to have an effect of suppressing damage caused by the pro-eutectoid cementite structure. However, in the technique described in Patent Document 3, it is not assumed that breakage caused by brittle fracture occurring in the head portion under a severe use environment as described above is prevented. In the technique described in Patent Document 3, there is room for further improving the use performance of the rail.

The present invention has been made in view of the problem points, and an object of the present invention is to improve fatigue damage resistance and breakage resistance in a welded joint portion of a welded rail. Preferably, it is an object of the present invention to provide a rail capable of satisfying extremely severe fatigue damage resistance and breakage resistance requirements in a welded joint portion of a rail of a freight railway having a severe track environment.

Means for Solving the Problem

The gist of the present invention is the following rail.

(1) A welded rail according to an aspect of the present invention includes: a plurality of rail portions; and a welded joint portion which joins the rail portion, in which the rail portion contains, as a chemical composition, in a unit mass %, 0.85 to 1.20% of C, 0.10 to 2.00% of Si, 0.10 to 2.00% of Mn, 0.10 to 1.50% of Cr, 0.0250% or less of P, 0.0250% or less of S, 0 to 0.50% of Mo, 0 to 1.00% of Co, 0 to 0.0050% of B, 0 to 1.00% of Cu, 0 to 1.00% of Ni, 0 to 0.20% of V, 0 to 0.0500% of Nb, 0 to 0.0500% of Ti, 0 to 0.0200% Mg, 0 to 0.0200% Ca, 0 to 0.0500% of REM, 0 to 0.0200% of N, 0 to 0.0200% of Zr, and 0 to 1.000% of Al, the remainder includes Fe and impurities, in a cross section parallel to a longitudinal direction and a vertical direction of the welded rail and passing through a center of the welded rail in a width direction, a HAZ width (W), which is a distance between two most softened portions formed on both sides of a welding center of the welded joint portion measured along the longitudinal direction of the welded rail, is 60 mm or less, and an interval between the most softened portion and the welding center measured along the longitudinal direction in the cross section is defined as WX and a region where a distance from the welding center is 0.6 WX to 0.7 WX and a depth from a top portion outer surface is 2 to 5 mm is defined as a pro-eutectoid cementite structure evaluation region, and in the pro-eutectoid cementite structure evaluation region, a total number of intersections (N) of a pro-eutectoid cementite structure intersecting a cross line including two line segments having a length of 100 μm parallel to the longitudinal direction and the vertical direction is 26 or less.

(2) In the welded rail according to (1) above, the HAZ width (W) of the welded joint portion and the total number of intersections (N) of the pro-eutectoid cementite structure may further satisfy the following formula 1, $$N \leq 4.6 \times \mathrm{LN}(W) \quad \text{formula 1}$$

where "LN" in the formula 1 is a natural logarithm.

Effects of the Invention

According to the above aspect of the present invention, the fatigue damage resistance and the breakage resistance of the welded joint portion can be improved, and the service life of the rail can be greatly improved.

EMBODIMENT OF THE INVENTION

Figure 1:
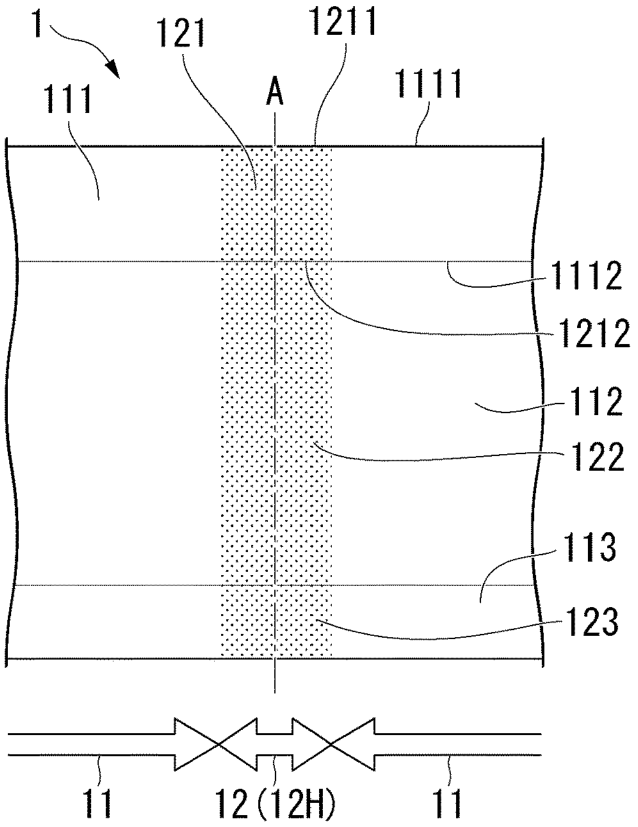
FIG. 1 is a side view of a welded joint portion of a welded rail.

As shown in FIG. 1, the flash butt welded rail (Hereinafter, it is simply referred to as a "welded rail 1") includes a plurality of rail portions 11 and a welded joint portion 12 that joins the rail portions 11. The present inventors have extensively conducted studies on a method for improving fatigue damage resistance and breakage resistance of the welded joint portion 12. The present inventors have found that the fatigue damage resistance of the welded joint portion 12 is improved as the HAZ width of the welded joint portion 12 is reduced. On the other hand, the present inventors have also found that the breakage resistance of the welded joint portion 12 is impaired as the HAZ width of the welded joint portion 12 is reduced. As a result of various studies conducted by the present inventors on this phenomenon, it has been found that as the HAZ width of the welded joint portion 12 is reduced, the width of the softened portion in the welded joint portion 12 is reduced and the macroscopic ductility is reduced, thereby impairing the breakage resistance of the welded rail 1.

Figure 3:
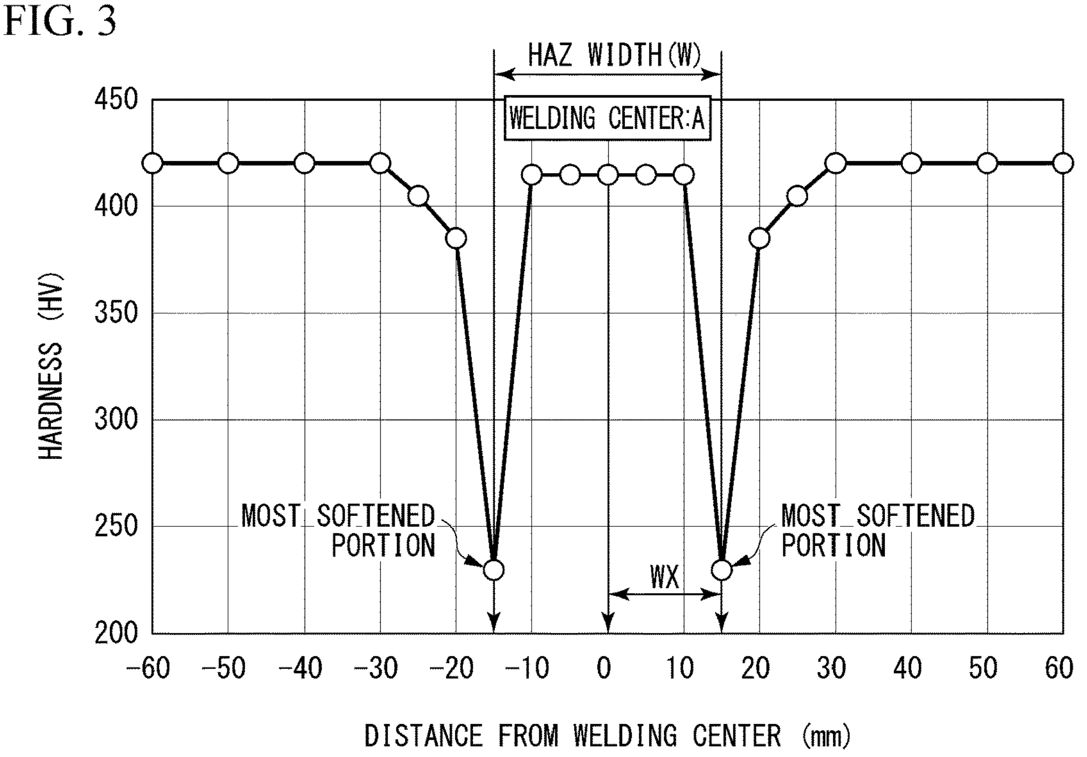
FIG. 3 is a schematic diagram of a cross section hardness distribution at a position of 5 mm in depth from a top portion outer surface obtained by measuring hardness of a welded joint portion of a welded rail along a longitudinal direction of the welded rail.
Figure 5:
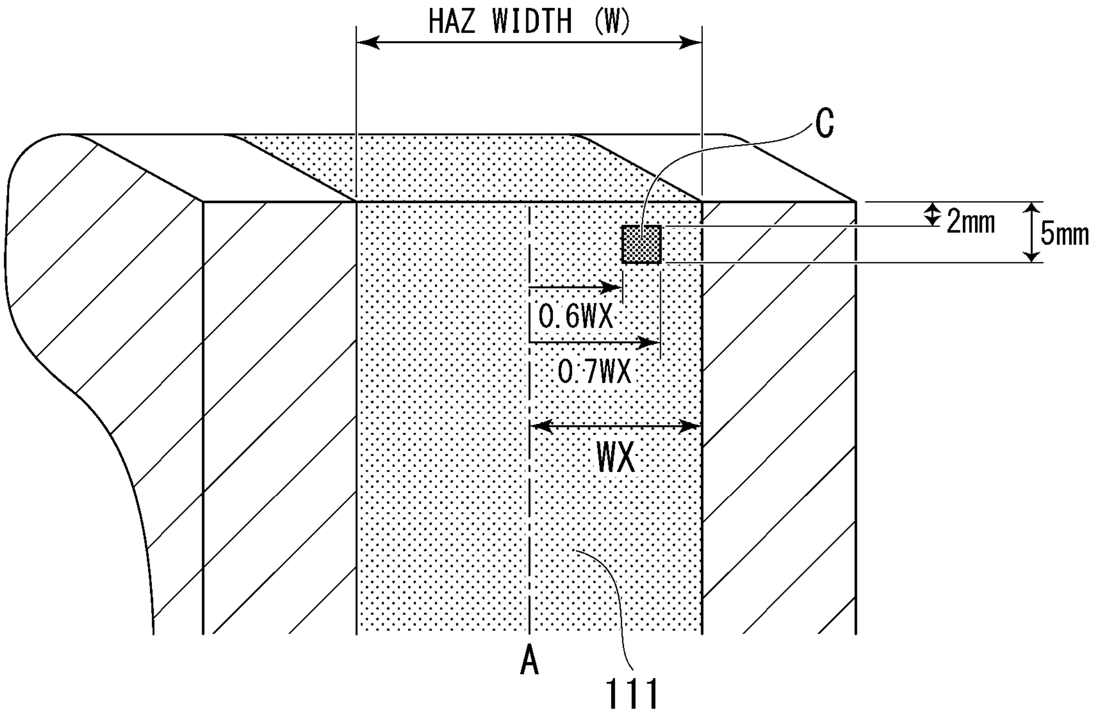
FIG. 5 is a schematic view of a pro-eutectoid cementite structure evaluation region.

The present inventors of the present invention optimize the welding conditions and the heat treatment conditions after completion of welding, and thereby (1) the HAZ width in the welded joint portion 12 shown in FIG. 3 was reduced; and (2) the precipitation amount of pro-eutectoid cementite in the pro-eutectoid cementite structure evaluation region C of the welded joint portion 12 shown in FIG. 5 was reduced.

As a result, the present inventors have been able to improve the fatigue damage resistance and the breakage resistance of the welded joint portion 12 and greatly improve the service life thereof. Furthermore, the present inventors were able to further improve the service life of the welded joint portion 12 by limiting the relationship between the HAZ width and the precipitation amount of pro-eutectoid cementite.

The welded rail 1 having excellent fatigue damage resistance and breakage resistance according to an embodiment of the present invention obtained based on the above findings is described in detail. Hereinafter, the mass % in the composition is simply referred to as %.

First, terms used in the present embodiment is described.

A flash butt welded rail 1 is a rail obtained by joining the rails by flash butt welding. Hereinafter, the flash butt welded rail 1 is simply referred to as a "welded rail 1".

Figure 2:
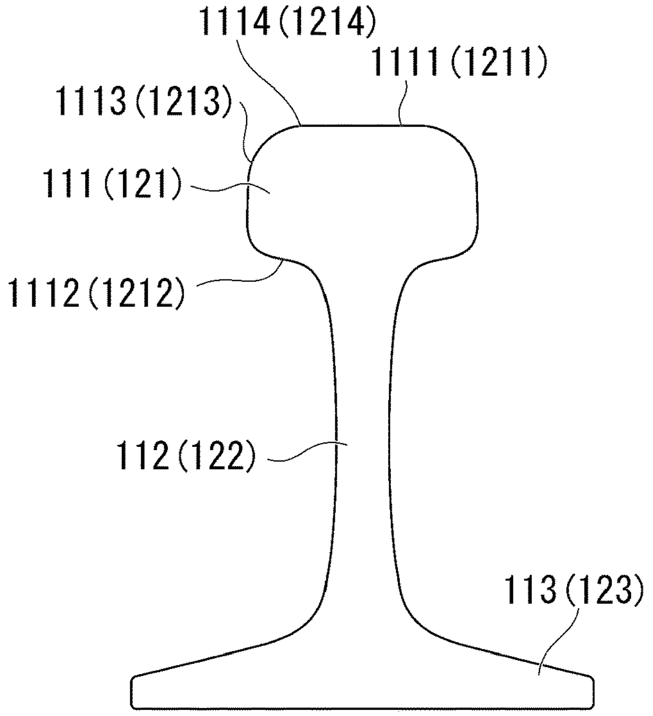
FIG. 2 is a cross section view perpendicular to a longitudinal direction of a rail portion of a welded rail.

As shown in FIG. 1 and FIG. 2, the welded rail 1 includes a plurality of rail portions 11 each having a rail head portion 111, a rail web portion 112, and a rail base portion 113, and a welded joint portion 12 that joins these rail portions 11. In FIG. 1, a reference number "A" indicates a welding center to be described later. Hereinafter, when simply described as "rail", it means a rail before welding, and when described as "rail portion", it means a base material portion of the welded rail.

The rail head portion 111 of the rail portion 11 refers to a portion above the constricted portion at the center in the vertical direction of the rail portion 11 in the cross section perpendicular to the longitudinal direction of the rail portion 11 shown in FIG. 2. In addition, a rail web portion 112 refers to a constricted portion at the center in the vertical direction of the rail portion 11 in the cross section of the rail portion 11 shown in FIG. 2. Furthermore, the rail base portion 113 refers to a portion below the constricted portion at the center in the vertical direction of the rail portion 11 in the cross section of the rail portion 11 shown in FIG. 2.

In addition, in the rail head portion 111, an outer surface of the upper portion is referred to as a rail head top surface or a rail top portion outer surface 1111. In addition, a constricted portion of the lower portion of the rail head portion 111 is referred to as a rail jaw lower portion 1112. The head side surface of the rail head portion 111 is referred to as a rail head side portion outer surface 1113. In the head top surface of the rail, an outer surface close to the corner portion of the rail portion 11 is referred to as a rail top portion corner side outer surface 1114. As a matter of course, the vertical direction of the welded rail 1 means the vertical direction when the welded rail 1 is used as a track.

The welded joint portion 12 is a "welded joint" defined in JIS Z 3001-1:2018, and means a connected portion in which members are united by welding. In the present embodiment, the member is a rail that is a material of the rail portion 11. The welded joint portion 12 includes a heat affected zone (HAZ) 12H.

In the welded rail 1, the shape of the welded joint portion 12 is substantially the same as that of the rail portion 11. Therefore, the welded joint portion 12 also has the head portion 121, the web portion 122, and the base portion 123 similarly to the rail portion 11. The head portion 121 of the welded joint portion 12 has a top portion outer surface 1211, a jaw lower portion 1212, a head side portion outer surface 1213, and a top portion corner side outer surface 1214. Hereinafter, the name of the head portion in the rail portion 11 is referred to as a "rail head portion 111", and the name of the head portion in the welded joint portion 12 is simply referred to as a "head portion 121". The term "rail" is attached to other sites when included in the rail portion 11, and the term "rail" is not attached when included in the welded joint portion 12.

As defined in JIS Z 3001-1:2018, the heat affected zone (HAZ) 12H means a portion of the base material which is not melted and in which metallurgical properties, mechanical properties and the like are changed by heat of welding, cutting and the like. In the present embodiment, the base material is the rail portion 11.

In the welded rail 1 according to the present embodiment, the width of the heat affected zone 12H along the longitudinal direction of the welded rail 1, that is, the HAZ width needs to be within a predetermined range. In the welded rail 1 according to the present embodiment, the HAZ width is defined based on the hardness distribution of the welded joint portion 12 measured in a section parallel to the longitudinal direction and the vertical direction of the welded rail 1 and passing through the center of the welded rail 1 in the width direction. A section parallel to the longitudinal direction and the vertical direction of the welded rail 1 and passing through the center in the width direction of the welded rail 1 is referred to as a "longitudinal direction cross section" in the present embodiment. Hereinafter, the outline of the hardness distribution of the welded joint portion 12 is described, and then the definition of the HAZ width is described.

FIG. 3 schematically illustrates hardness distribution in a longitudinal direction cross section in a portion 5 mm below the top portion outer surface 1211 of the welded joint portion 12. This graph is obtained by continuously measuring the Vickers hardness at a position 5 mm depth from the top portion outer surface 1211 of the welded joint portion 12 along the top portion outer surface 1211 in the longitudinal direction cross section of the welded joint portion 12. Note that the welding center A described in this graph means a straight line passing through the center of the heat affected zone 12H along the vertical direction of the welded rail in the longitudinal direction cross section of the welded joint portion 12. Typically, the welding center A generally coincides with the joint of the rail.

In the welded joint portion 12, a region heated to above point A1 by welding heat to be austenitized as a whole and then subjected to pearlitic transformation by temperature drop after completion of welding is formed. In addition, on both sides of this region, there are regions that are partially austenitized by being heated to the vicinity of the point A1 by the welding heat, and then the decomposition of the pearlite structure occurs due to the temperature drop after the welding is completed. In these regions, the hardness is significantly reduced. Therefore, usually, in the graph of the hardness distribution of the welded rail 1 obtained by flash butt welding, two valleys of Vickers hardness exist as shown in FIG. 3. A place where these valleys of the Vickers hardness occur is defined as a most softened portion of the welded rail 1 according to the present embodiment. The hardness of the most softened portion is about 230 HV or more, or 250 HV or more. Then, in the cross section of the welded joint portion 12 in the longitudinal direction, the interval between the two most softened portions specified by continuously measuring the Vickers hardness at a position 5 mm depth from the top portion outer surface 1211 of the welded joint portion 12 along the top portion outer surface 1211 is defined as the HAZ width W.

As shown in FIG. 5, the pro-eutectoid cementite structure evaluation region C means a region in which the distance from the welding center A is 0.6 WX to 0.7 WX and the depth from the top portion outer surface is 2 to 5 mm in the longitudinal direction cross section. Here, WX is an interval between the most softened portion and the welding center A measured along the longitudinal direction of the welded rail 1 in the longitudinal direction cross section. The technical significance of the pro-eutectoid cementite structure evaluation region C is described later. The pro-eutectoid cementite structure evaluation region C may be set on either the left or right side of the welding center A.

Next, a technical idea of the present invention is described. The present inventors have investigated damage occurring in a welded joint portion of a welded rail. As a result of examining the damage rail generated in the actual track, it has been confirmed that the damage generation form includes (1) breakage starting from a fatigue crack generated from the base portion of the welded joint portion, and (2) breakage starting from a brittle crack generated from the surface of the head portion of the welded joint portion.

Therefore, the cause of these occurrences was investigated. First, (1) breakage starting from a fatigue crack generated from the base portion of the welded joint portion was investigated. In the welded joint portion in which the fatigue crack was generated from the base portion of the welded joint portion, falling due to wear was large at the head portion of the welded joint portion. In addition, in such a welded rail, it has been found that the HAZ width of the welded joint portion is significantly large. When the wheel passes through the welded joint portion whose head portion is worn, bending deformation occurs in the welded rail due to the load of the vehicle, and this causes a tensile load on the foot portion of the welded joint portion. This tensile load causes a fatigue crack at the base portion of the welded joint portion.

(Relationship Between HAZ Width and Breakage (Table 1))

Figure 4:
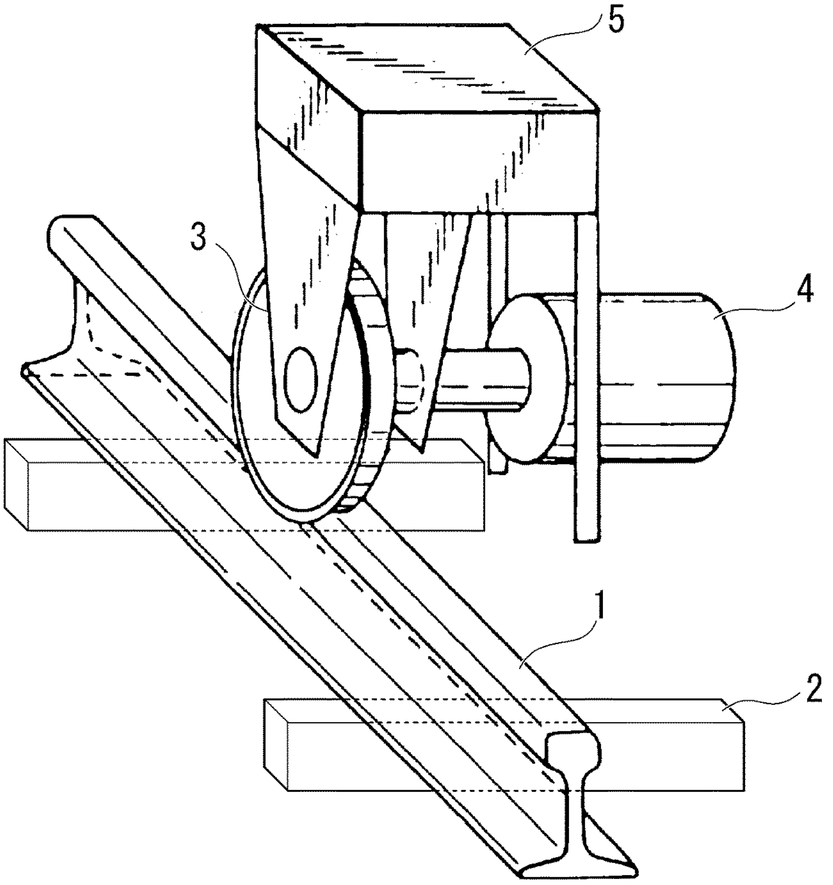
FIG. 4 is a schematic view of a rolling fatigue testing machine that reproduces damage due to rolling of a rail/wheel.

Furthermore, in order to suppress breakage starting from a fatigue crack generated from the base portion of the welded joint portion, the relationship between the HAZ width of the welded joint portion and breakage was verified. A flash butt welding test was performed using a hypereutectoid steel rail (0.80 to 1.20% of C) to create various welded joint portions with different HAZ widths. Control of the HAZ width was mainly achieved by controlling the late flashing speed just before upsetting in flash butt welding. Then, the relationship between the HAZ width and the base portion stress of the welded joint portion was evaluated using a tester that reproduces the damage due to the rolling of the rail/wheel shown in FIG. 4. In FIG. 4, a reference number 1 denotes the above-described welded rail, and a reference number 2 denotes a tie on which the welded rail 1 is placed. a reference number 5 denotes a load stabilizer that presses the wheel 3 rotated by the motor 4. In the rolling fatigue test, the wheel 3 repeatedly rolls the head portion of the welded rail 1 back and forth along the longitudinal direction while applying a predetermined load to the wheel 3 using the load stabilizer 5.

The rail, the flash butt welding conditions, the cooling conditions of the welded joint portion after welding, the characteristics of the welded joint portion, and the conditions of the rolling fatigue test of the rail/wheel are as follows. Cooling of the welded joint portion after welding was performed on the head top surface of the welding center (A) where falling due to wear mainly occurred.

Rail Serving as Welding Base Material

Components: 0.80 to 1.20% of C, 0.30% of Si, 0.60% of Mn, 0.0120% of P, 0.0100% of S, 0.35% of Cr, 0.0035% of N, and 0.0020% of Al are contained, the remainder is iron and an impurity Rail shape: 136 lbs (weight: 67 kg/m).

Hardness: 420 HV (head top surface)

Flash Butt Welding Conditions (Preheating Flashing Method)

Initial flashing time: 15 sec

Number of times of preheating: 2 to 16 times

Late flashing time: 15 to 30 sec

Average late flashing speed: 0.2 to 1.0 mm/sec

Late flashing speed immediately before upsetting (for 3 sec): 0.3 to 3.0 mm/sec

Upset load: 65 to 85 KN

Cooling Conditions of Welded Joint Portion after Welding

Average cooling rate of head top surface of welding center (A): more than 1.5 to 3.0° C./sec (temperature range: 800 to 550° C.)+subsequent air cooling (50° C.)

Figure 14A:
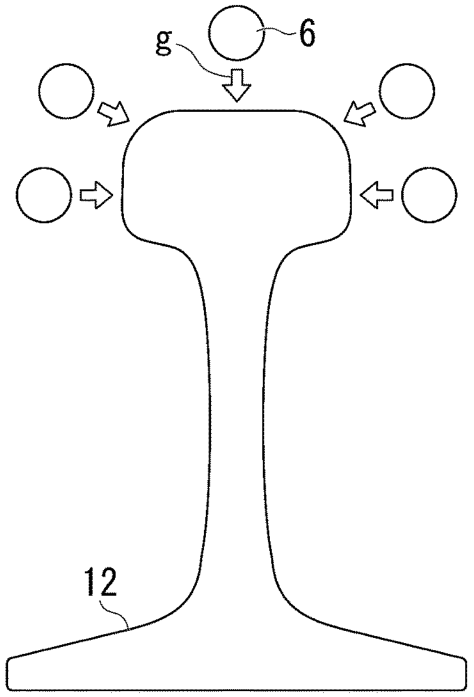
FIG. 14A is a cross section view of an example of a cooling device for a welded joint portion.

Cooling means: cooling device shown in FIGS. 14A and B

Figure 14B:
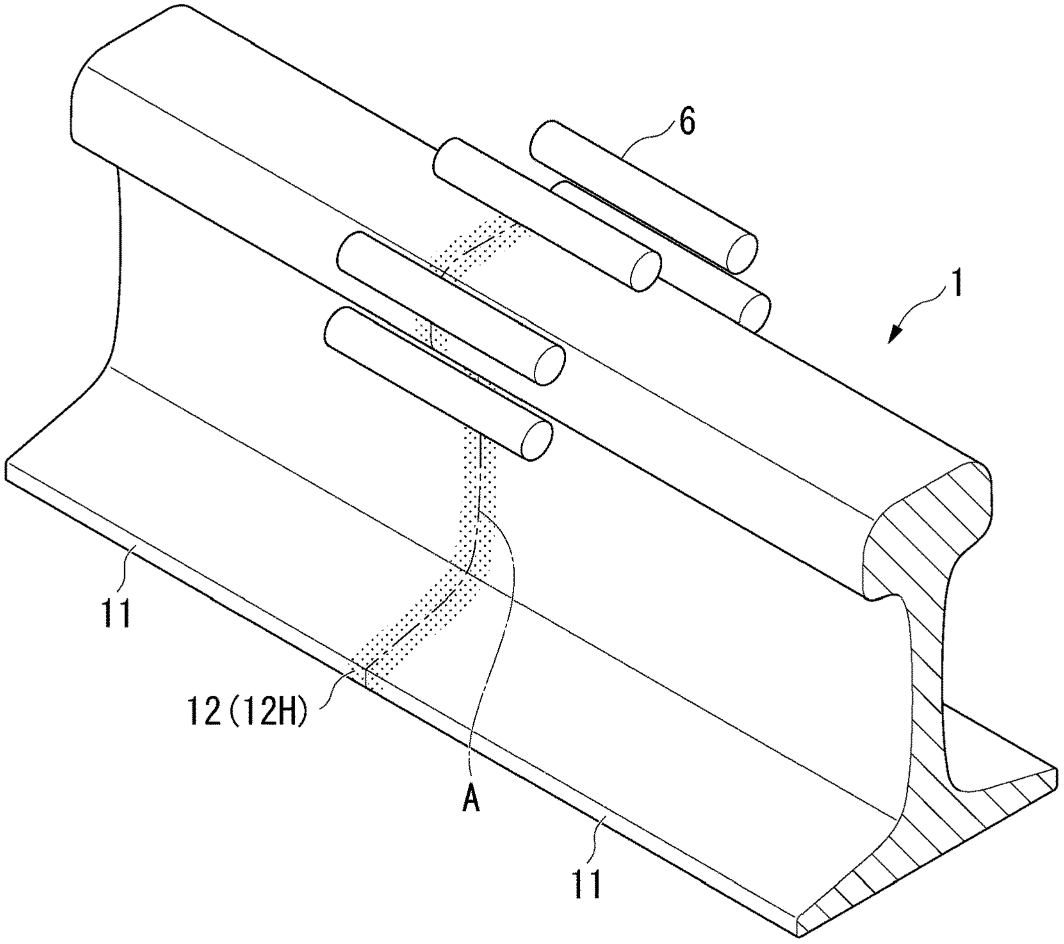
FIG. 14B is a perspective view of an example of the cooling device for the welded joint portion.

As shown in FIG. 14A and FIG. 14B, the cylindrical cooling device 6 was disposed around the welded joint portion 12. The longitudinal direction of the cylindrical cooling device 6 coincides with the longitudinal direction of the welded rail 1. As shown in FIGS. 15A to 15D, the cooling device 6 is provided with a plurality of cooling gas ejection ports 61 along the longitudinal direction of the cooling device 6. Using these cooling devices 6, the cooling gas g was sprayed onto the top portion outer surface 1211, the jaw lower portion 1212, and the head side portion outer surface 1213.

As shown in FIGS. 15A to 15D, by changing the interval between the plurality of cooling gas ejection ports 61, the cooling rate at the welding center A and the cooling rate at a location estimated to be 0.6 WX to 0.7 WX away from the welding center A were independently controlled.

Figure 15A:
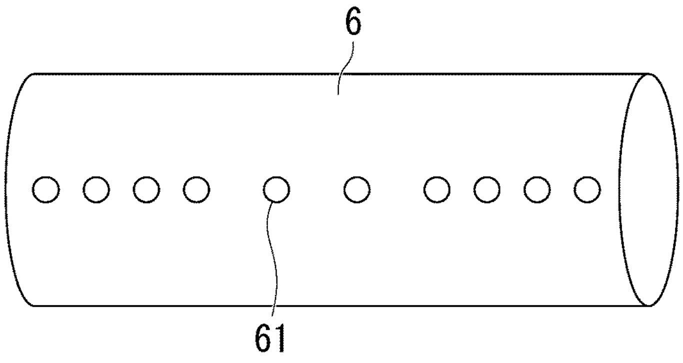
FIG. 15A is an example of a cooling gas ejection port provided in a cooling device of a welded joint portion.
Figure 15B:
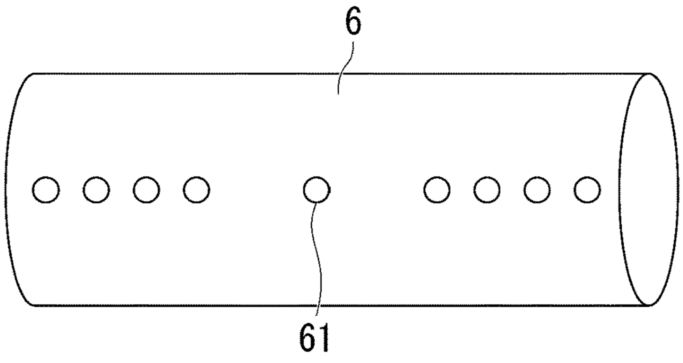
FIG. 15B is an example of a cooling gas ejection port provided in the cooling device of the welded joint portion.
Figure 15C:
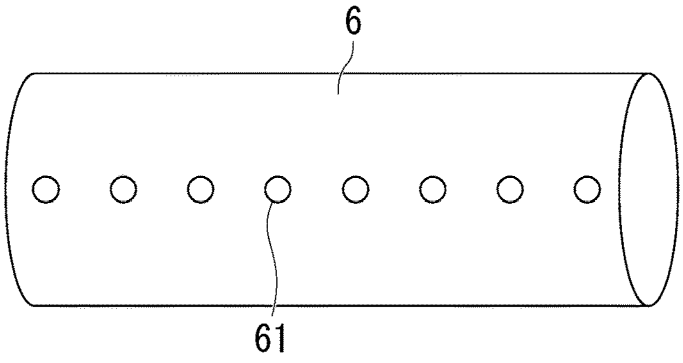
FIG. 15C is an example of a cooling gas ejection port provided in the cooling device of the welded joint portion.

For example, in the cooling device 6 of FIG. 15C, the plurality of cooling gas ejection ports 61 is uniformly arranged. Therefore, the cooling device 6 of FIG. 15 C can uniformly spray the cooling gas to the welded joint portion 12 along the longitudinal direction. On the other hand, in the cooling device 6 of FIG. 15A, the plurality of cooling gas ejection ports 61 is arranged at wide intervals at the center in the longitudinal direction, and is arranged at narrow intervals in the vicinity of the end portion in the longitudinal direction. At the time of cooling, the center portion in the longitudinal direction of the cooling device 6 is arranged so as to face the welding center A, and the end portion in the longitudinal direction of the cooling device 6 is disposed so as to face a location estimated to be the most softened portion. Therefore, according to the cooling device 6 of FIG. 15A, the spraying amount of the cooling gas at the most softened portion is larger than the spraying amount of the cooling gas at the welding center A.

Figure 15D:
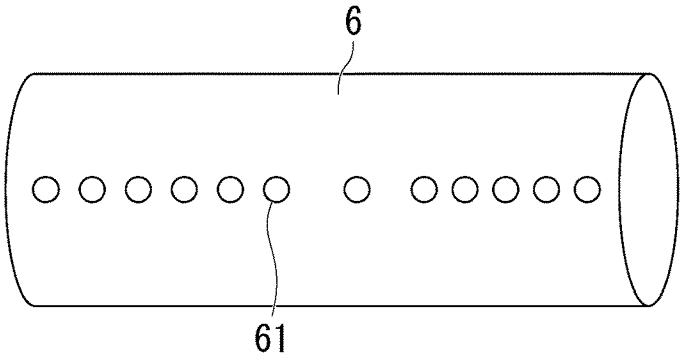
FIG. 15D is an example of a cooling gas ejection port provided in the cooling device of the welded joint portion.

In the cooling device 6 of FIG. 15B and FIG. 15D, as in FIG. 15A, the plurality of cooling gas ejection ports 61 is arranged at wide intervals at the center in the longitudinal direction, and is arranged at narrow intervals in the vicinity of the end portion in the longitudinal direction. However, in FIG. 15B, the interval between the cooling gas ejection ports 61 at the center in the longitudinal direction is further widened as compared with FIG. 15A. Therefore, as compared with the cooling device of FIG. 15A, the cooling device of FIG. 15B has a small cooling gas spraying capacity with respect to the welding center A. In FIG. 15D, as compared with FIG. 15A, the interval between the cooling gas ejection ports 61 in the vicinity of the end portion in the longitudinal direction is further narrowed. Therefore, as compared with the cooling device of FIG. 15A, the cooling device of FIG. 15D has a large cooling gas spraying capacity with respect to the most softened portion.

Characteristics of Welded Joint Portion

HAZ width: 10 to 80 mm

Hardness of welding center: 390 to 440 HV

Hardness of most softened portion: 280 HV

Rail/Wheel Rolling Fatigue Test Conditions

Tester: Rolling fatigue tester (see FIG. 4)

Shape of welded rail to be test piece: length of 2 m (welded joint portion is present at a center portion in length direction)

Wheel: AAR type (diameter 920 mm)

Radial load: 300 KN

Thrust load: 50 KN

Base portion stress: 400 MPa (measured value measured using strain gauge at the initial stage of the test)

Lubrication: repeated lubrication with water and drying (That is, a cycle of applying water to the welded rail for a certain period of time and then stopping the supply of water to dry the water is repeated.)

Number of repetitions of load application using wheel: maximum 4 million times

Cumulative Passage Tonnage: up to 120 million tons

Acceptance criteria: unfractured until 2 million times of application of load

Cumulative passage tonnage: evaluated by the total weight of the freight car traveling on the welded rail, twice the passage weight acting from the wheel in the case of the present test. That is, a value obtained by the above-described radial load (300 kN)×the number of times of wheel passage×2 is the cumulative passage tonnage.

Evaluation

Method of investigation of base portion crack of welded joint portion: visual observation and magnetic powder detection

TABLE 1

| HAZ width (mm) | Number of times of repetition until fracture | Determination |
|---|---|---|
| Exceed 60 and 80 or less | Less than 2 million | Failed |
| 40 or more and 60 or less | 2 million or more and less than 3 million | Pass |
| 20 or more and less than 40 | 3 million or more and less than 4 million | Pass |
| 10 or more and less than 20 | Unfractured after 4 million | Pass |

As a result, as shown in Table 1, as the HAZ width was smaller, the number of times of repetition until fracture increased, and the service life of the welded joint portion was improved. In addition, the smaller the HAZ width, the smaller the unevenness generated in the welded joint portion.

Specifically, when the HAZ width exceeded 60 mm, the unevenness generated in the welded joint portion increased, and the number of wheel passage repetitions until fracture was less than 2 million, so that the acceptance criteria were not satisfied. In addition, when the HAZ width was in the range of 40 mm or more and 60 mm or less, the unevenness generated in the welded joint portion was reduced, the number of wheel passage repetitions until fracture exceeded 2 million times, and the number of wheel passage repetitions until fracture fell in the range of 2 million times or more and less than 3 million times, and thus the acceptance criteria were satisfied. Furthermore, when the HAZ width was 20 mm or more and less than 40 mm, the unevenness generated in the welded joint portion further decreased, and the number of wheel passage repetitions until fracture fell within the range of 3 million times or more and less than 4 million times. In addition, when the HAZ width was 10 mm or more and less than 20 mm, the unevenness generated in the welded joint portion further decreased, and the fracture did not occur even when the number of wheel passage repetitions was 4 million times.

According to this test, it was found that the service life of the welded joint portion was further improved as the HAZ width decreased.

(Relationship Between Total Number of Intersections of Pro-Eutectoid Cementite Structure and Breakage (FIG. 8))

Next, (2) the cause of breakage starting from a brittle crack was investigated from the surface of the head portion of the welded joint portion. As a result of investigating the relationship between the breakage starting point of the welded rail in which breakage occurred and the metallographic structure, it was confirmed that a pro-eutectoid cementite structure was formed at the starting point of breakage.

Therefore, the starting point of breakage was identified. As a result, it was confirmed that breakage occurred in the heat affected zone 12H (HAZ).

Further, the generation site was identified in detail. As a result, in the cross section hardness distribution of the welded joint portion in the longitudinal direction shown in FIG. 3, when the distance between the welding center (A) and the most softened portion is WX, it was confirmed that breakage occurred from a site within a range of 0.6 WX to 0.7 WX from the welding center A and within a range of 2 to 5 mm in depth from the top portion outer surface. This site corresponds to the above-described pro-eutectoid cementite structure evaluation region C.

Therefore, the relationship between the pro-eutectoid cementite structure of the site and breakage of the welded joint portion was investigated. First, the relationship between the formation amount of the pro-eutectoid cementite structure and breakage of the welded joint portion was investigated. A flash butt welding test was performed using a hyper-eutectoid steel rail (1.00% of C), a drop weight test of the welded rail shown in FIG. 4 was performed, and the relationship between the formation amount of pro-eutectoid cementite structure and the presence or absence of breakage of the welded joint portion was evaluated. The formation amount of the pro-eutectoid cementite structure was controlled by controlling the cooling rate of the top portion outer surface at a distance of 0.6 WX to 0.7 WX from the welding center in the welded joint portion where the pro-eutectoid cementite structure was formed. The control of the HAZ width was achieved mainly by controlling the number of times of preheating, an average late flashing speed, and a late flashing speed immediately before upsetting in flash butt welding. In addition, the rail, the flash butt welding conditions, the cooling conditions of the welded joint portion after welding, the characteristics of the welded joint portion, the method for evaluating the pro-eutectoid cementite structure, and the conditions of the drop weight test are as follows.

Rail Serving as Welding Base Material

Components: 1.00% of C, 0.30% of Si, 0.60% of Mn, 0.0120% of P, 0.0100% of S, 0.35% of Cr, 0.0035% of N, 0.0020% of Al are contained, the remainder is iron and an impurity Rail shape: 136 lbs (weight: 67 kg/m).

Hardness: 420 HV (head top surface)

Flash Butt Welding Conditions (Preheating Flashing Method)

Initial flashing time: 15 sec

Number of times of preheating: 2 to 14 times

Late flashing time: 15 to 30 sec

Average late flashing speed: 0.3 to 1.0 mm/sec

Late flashing speed immediately before upsetting (for 3 sec): 0.5 to 3.0 mm/sec

Upset load: 65 to 85 KN

Cooling Conditions of Welded Joint Portion after Welding

Average cooling rate of head top surface of welding center (A): more than 1.5 to 3.5/sec (temperature range: 800 to 550° C.)+subsequent air cooling (50° C.) Average cooling rate of 0.6 WX to 0.7 WX top portion outer surface of welded joint portion: 0.8 to 4.0° C./sec (temperature range: 800 to 550° C.)+0.1 to 1.5° C./sec (temperature range: 550 to 450° C.)+subsequent air cooling (50° C.)

Cooling means: cooling device shown in FIG. 14A to FIG. 14B

Characteristics of Welded Joint Portion

HAZ width: 10 to 60 mm

Hardness of welding center: 380 to 440 HV

Hardness of most softened portion: 280 HV

Total number of intersections (N) of pro-eutectoid cementite structure in pro-eutectoid cementite structure evaluation region C: 20 to 34

Method for Evaluating Pro-Eutectoid Cementite Structure

Evaluation site (see FIG. 5): a site at a distance of 0.6 WX to 0.7 WX from the welding center and at a depth of 2 to 5 mm from the top portion outer surface when the distance between the welding center (A) and the most softened portion is WX in the longitudinal direction cross section of the welded joint portion.

Reason for selection of evaluation site: It is a position where breakage starting from the pro-eutectoid cementite structure occurs.

Method for evaluating pro-eutectoid cementite structure: A pro-eutectoid cementite structure evaluation region was polished, then cementite etching was performed, observation was performed with an optical microscope, and a pro-eutectoid cementite structure was photographed.

Polishing conditions: buffing with 1 μm diamond paste

Pro-eutectoid cementite etch conditions

Etching solution: sodium picrate solution

Etching conditions: 80° C.×120 minutes

Investigation Method

Apparatus: optical microscope

Magnification: 500 times

Evaluation method (see FIG. 6): The number of pro-eutectoid cementite structures intersecting two orthogonal line segments having a length of 100 μm was counted. One of two orthogonal line segments was parallel to the longitudinal direction of the welded rail, and the other was perpendicular to the vertical direction of the welded rail. Two orthogonal line segments formed a cross line intersecting each other at their midpoints.

The total number of intersections (N) of the pro-eutectoid cementite structure was defined as the total (Xn+Yn) of the number of cementites (Xn, Yn) intersecting each orthogonal line segment of 100 μm.

Figure 6:
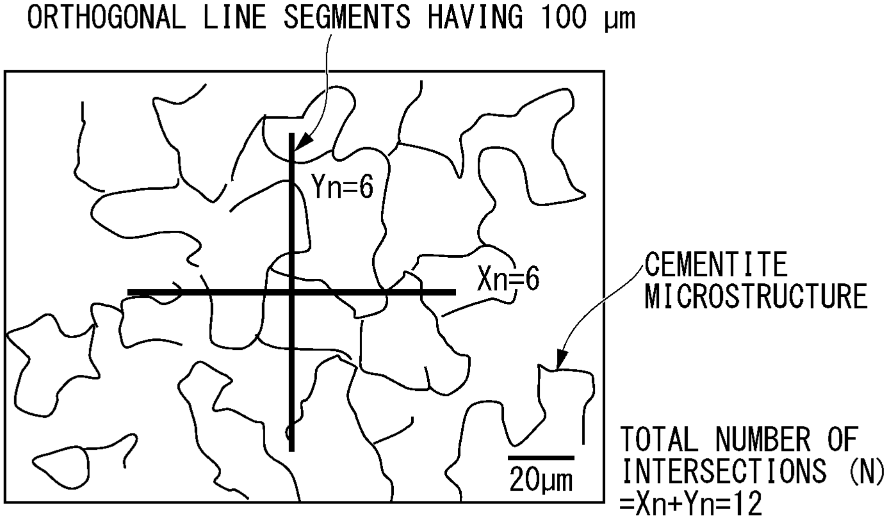
FIG. 6 is a schematic view of a method for evaluating the pro-eutectoid cementite structure in a pro-eutectoid cementite structure evaluation region.

In the component system of the rail portion of the welded rail according to the present embodiment, pro-eutectoid cementite is usually precipitated in a network shape as shown in FIG. 6. Since it may be difficult to distinguish granular cementite as an inclusion such as MnS, it is preferable to measure only network cementite when measuring the total number of intersections of the pro-eutectoid cementite structure.

Quantification: Two orthogonal line segments having a length of 100 μm were described at 20 locations in the pro-eutectoid cementite evaluation region, and the total number of intersections of the pro-eutectoid cementite structure was measured. Then, the average value of the total number of intersections in each photograph was regarded as the total number of intersections (N) of the pro-eutectoid cementite structure in the welded joint portion.

Figure 7:
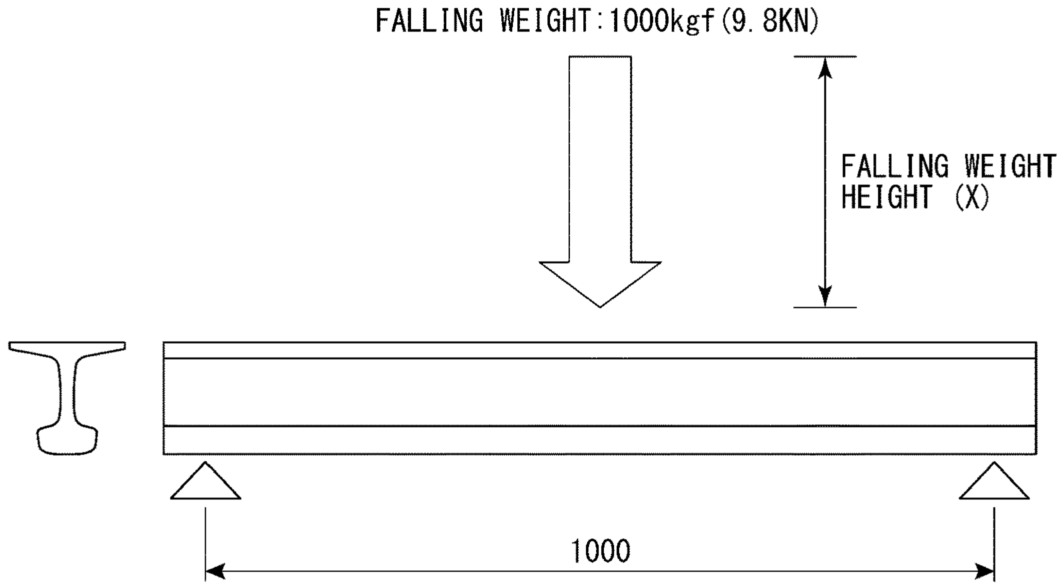
FIG. 7 is a schematic view of drop weight test conditions.

Drop Weight Test Conditions (See FIG. 7)

Attitude: The welded rail is supported at two points with the head portion on the lower side and the base portion on the upper side, and a falling weight is dropped to the base portion of the welded joint portion.

Span (interval between two support points): 1000 mm

Weight of Falling weight: 1000 kgf (9.8 kN)

Falling weight height (X): 3.0 m

Falling weight energy: 29.4 kN·m

Figure 8:
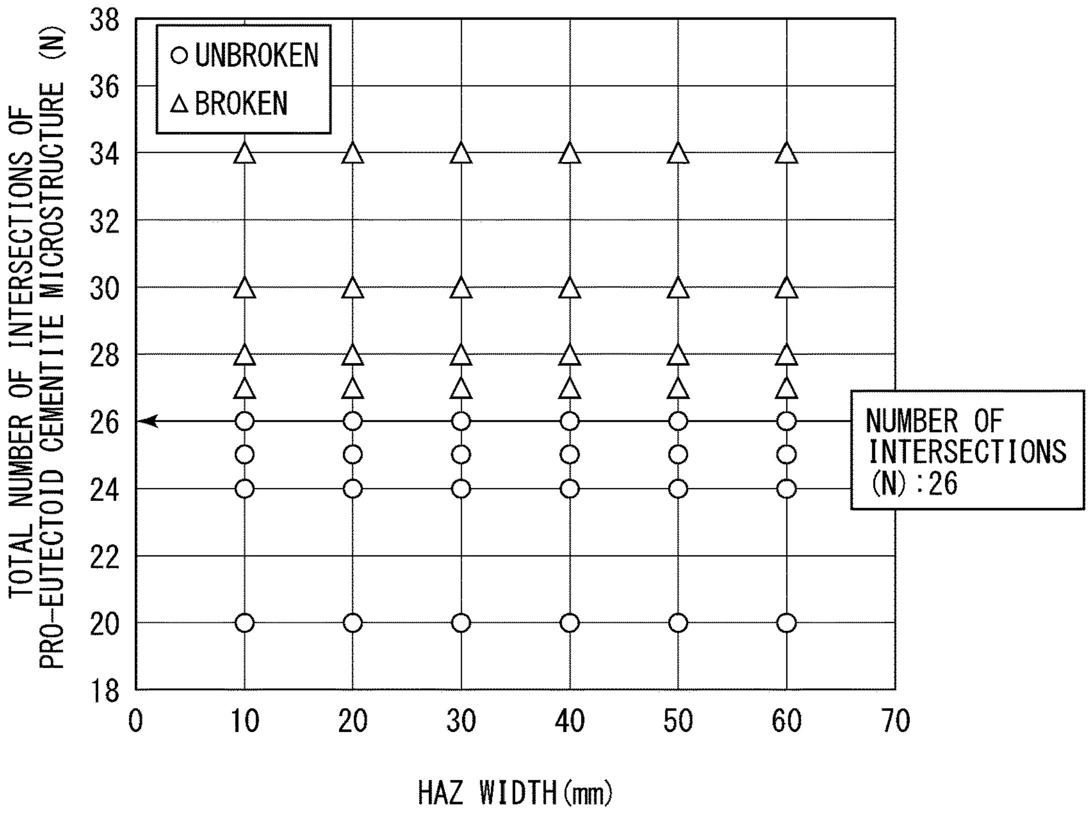
FIG. 8 is a graph showing the relationship between the pro-eutectoid cementite structure and the breakage property.

As a result, as shown in FIG. 8, it was found that when the total number of intersections (N) of the pro-eutectoid cementite structure in the evaluation region of the pro-eutectoid cementite structure exceeds 26, breakage of the welded joint portion occurs in the drop weight test.

(Relationship Between HAZ Width and Falling Weight Energy (FIG. 9))

Furthermore, in order to drastically improve the use performance of the welded joint portion used in the track environment that becomes severe due to the high loading of freight cars in recent years, the present inventors have investigated in detail the relationship between the breakage caused by the brittle fracture occurring at the head portion and the HAZ width of the welded joint portion. In the pro-eutectoid cementite structure evaluation region C shown in FIG. 5, the number of pro-eutectoid cementite structures formed in the cross section of the welded joint portion in the longitudinal direction was further controlled (total number of intersections of pro-eutectoid cementite structures: N=18), and the correlation between the HAZ width and the breakage resistance of the welded joint portion was investigated under the drop weight test conditions in which more severe track conditions were reproduced. The number of formed pro-eutectoid cementite structures was mainly controlled by controlling the cooling rate of the top portion outer surface at a distance of 0.6 WX to 0.7 WX from the welding center in the welded joint portion where the pro-eutectoid cementite structure was formed. The range between the upper limit and the lower limit of the cooling rate was narrowed, and the total number of intersections of the pro-eutectoid cementite structure was controlled to be constant. The control of the HAZ width was mainly achieved by controlling the number of preheating times, the average late flashing speed, and the lower limit of the late flashing speed immediately before upsetting in flash butt welding.

A flash butt welding test was performed using a hyper-eutectoid steel rail (1.00% of C), a drop weight test of the welded rail shown in FIG. 7 was performed, and the relationship between the formation amount of pro-eutectoid cementite structure and the presence or absence of breakage of the welded joint portion was evaluated. The rail, flash butt welding conditions, and method for evaluating the pro-eutectoid cementite structure were the same as the conditions of the welding test for the graph of FIG. 8. The cooling conditions of the welded joint portion after welding, the characteristics of the welded joint portion, and the conditions of the drop weight test are as follows.

Cooling Conditions of Welded Joint Portion after Welding

Average cooling rate of head top surface of welding center (A): more than 1.5 to 3.5° C./sec (temperature range: 800 to 550° C.)+subsequent air cooling (50° C.)

Average cooling rate of 0.6 WX to 0.7 WX top portion outer surface of welded joint portion: 1.7 to 2.8° C./sec (temperature range: 800 to 550° C.)+0.8 to 1.5° C./sec (temperature range: 550 to 450° C.)+subsequent air cooling (50° C.)

Cooling means: cooling device shown in FIG. 14A to FIG. 14B

Characteristics of Welded Joint Portion

HAZ width: 10 to 60 mm

Hardness of welding center: 380 to 440 HV

Hardness of most softened portion: 280 HV

Total number of intersections (N) of pro-eutectoid cementite structure: 18

Drop Weight Test Conditions (See FIG. 7)

Attitude: The welded rail is supported at two points with the head portion on the lower side and the base portion on the upper side, and a falling weight is dropped to the base portion of the welded joint portion.

Span (interval between two support points): 1000 mm

Weight of Falling weight: 1000 kgf (9.8 kN)

Falling weight height (X): 4.0 to 11.0 m

Falling weight energy: 39.2 to 107.8 kN·m

Figure 9:
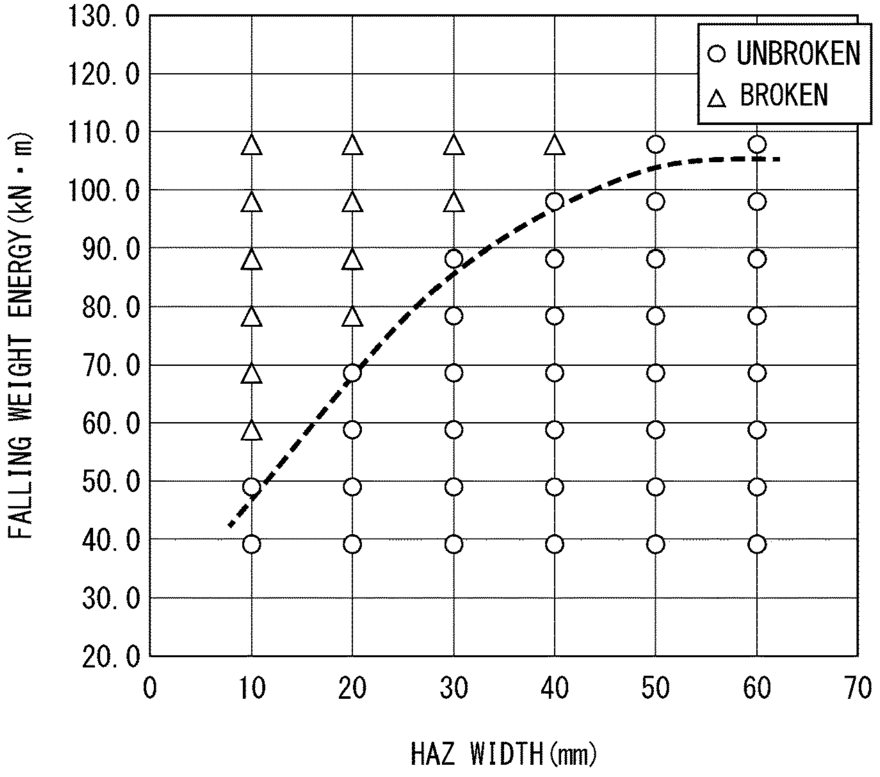
FIG. 9 is a graph showing the influence of the HAZ width on the breakage property.

As a result, as shown in FIG. 9, in a state where the total number of intersections (N) of the pro-eutectoid cementite structure was the same, there was a correlation between the HAZ width of the welded joint portion and the breakage property of the welded joint portion. As the HAZ width decreases, falling weight energy causing breakage decreases. That is, the present inventors have found that the breakage resistance of the welded joint portion decreases as the HAZ width decreases. The present inventors have found that this decrease in the breakage property is caused by a decrease in the softened portion of the welded joint portion accompanying a decrease in the HAZ width, that is, a decrease in macroscopic ductility.

(Suitable Relationship Between HAZ Width and Total Number of Intersections of Pro-Eutectoid Cementite Structure (FIG. 10A to FIG. 10C and FIG. 11))

Furthermore, the present inventors have investigated in detail the breakage resistance of the welded joint portion which varies depending on the HAZ width. In the pro-eutectoid cementite structure evaluation region C shown in FIG. 5, the correlation between the formation status of the pro-eutectoid cementite structure in the cross section in the longitudinal direction of the welded joint portion and the breakage resistance of the welded joint portion was investigated under the drop weight test conditions. Flash butt welding tests were performed using hyper-eutectoid steel rails (1.00% of C). Next, the drop weight test of the welded joint portion shown in FIG. 7 was performed to evaluate the relationship between the formation amount of the pro-eutectoid cementite structure and the presence or absence of breakage of the welded joint portion. As a result, the formation situation of the pro-eutectoid cementite structure capable of preventing breakage was investigated. The number of formed pro-eutectoid cementite structures was mainly controlled by controlling the cooling rate of the top portion outer surface at a distance of 0.6 WX to 0.7 WX from the welding center in the welded joint portion where the pro-eutectoid cementite structure was formed. The range of the cooling rate was limited, and the total number of intersections of the pro-eutectoid cementite structure was controlled to be in a certain range. The control of the HAZ width was mainly achieved by controlling the number of preheating times, the average late flashing speed, and the lower limit of the late flashing speed immediately before upsetting in flash butt welding.

The rail, flash butt welding conditions, and method for evaluating the pro-eutectoid cementite structure were the same as the conditions of the welding test for the graph of FIG. 8. The cooling conditions of the welded joint portion after welding, the characteristics of the welded joint portion, and the conditions of the drop weight test are as follows.

Cooling Conditions of Welded Joint Portion after Welding

Average cooling rate of head top surface of welding center (A): more than 1.5 to 3.5/sec (temperature range: 800 to 550° C.)+subsequent air cooling (50° C.)

Average cooling rate of the top portion outer surface of 0.6 WX to 0.7 WX of the welded joint portion: more than 1.5 to 3.5° C./sec (temperature range: 800 to 550° C.)+0.2 to 1.5° C./sec (temperature range: 550 to 450° C.)+subsequent air cooling (50° C.)

Cooling means: cooling device shown in FIG. 14A to FIG. 14B

Characteristics of Welded Joint Portion

HAZ width: 10, 20, 30, 40, 50, and 60 mm (6 levels)

Hardness of welding center: 380 to 440 HV

Hardness of most softened portion: 280 HV

Total number of intersections (N) of pro-eutectoid cementite structure: 6 to 26

Drop Weight Test Conditions (See FIG. 7)

Attitude: The welded rail is supported at two points with the head portion on the lower side and the base portion on the upper side, and a falling weight is dropped to the base portion of the welded joint portion.

Span (interval between two support points): 1000 mm

Weight of Falling weight: 1000 kgf (9.8 kN)

Falling weight height (X): 6 levels within a range of 7.0 to 12.0 m

Falling weight energy: 6 levels within the range of 68.6 to 117.6 kN·m

Drop weight test conditions to prevent breakage under severe track conditions

Falling weight height (X): 9.0 m

Breakage prevention reference energy: 88.2 kN·m

Figure 10A:
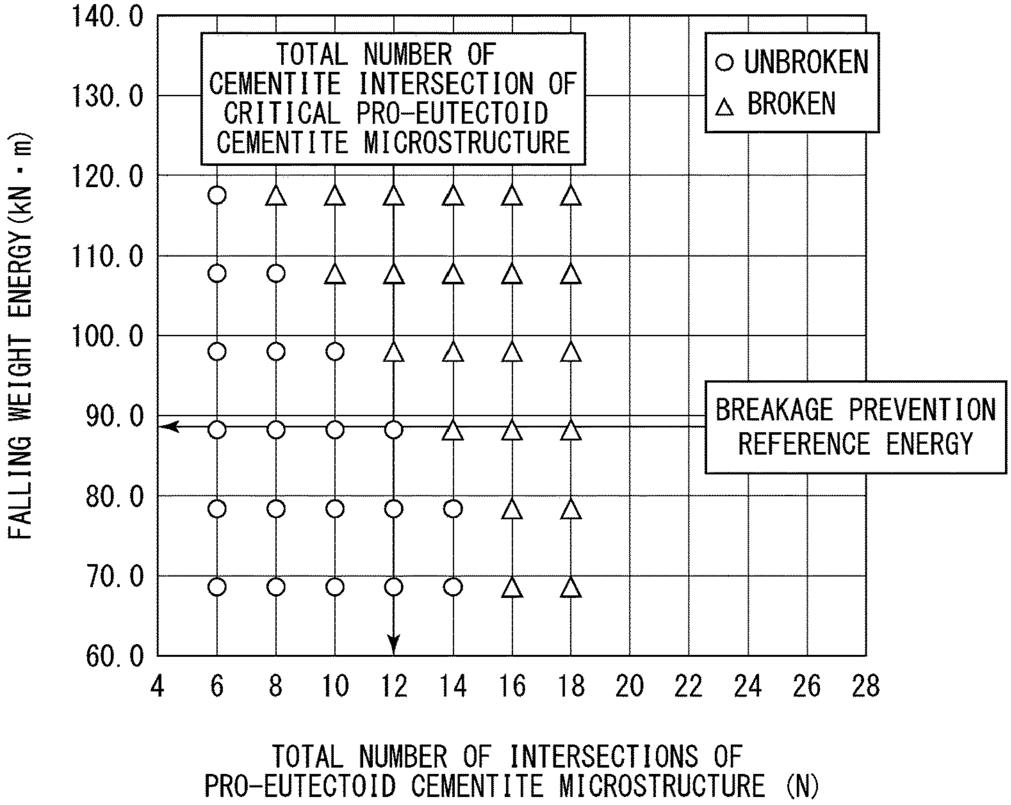
FIG. 10A is a graph showing the influence of the pro-eutectoid cementite structure on the breakage property in a welded joint portion having a HAZ width of 10 mm.
Figure 10B:
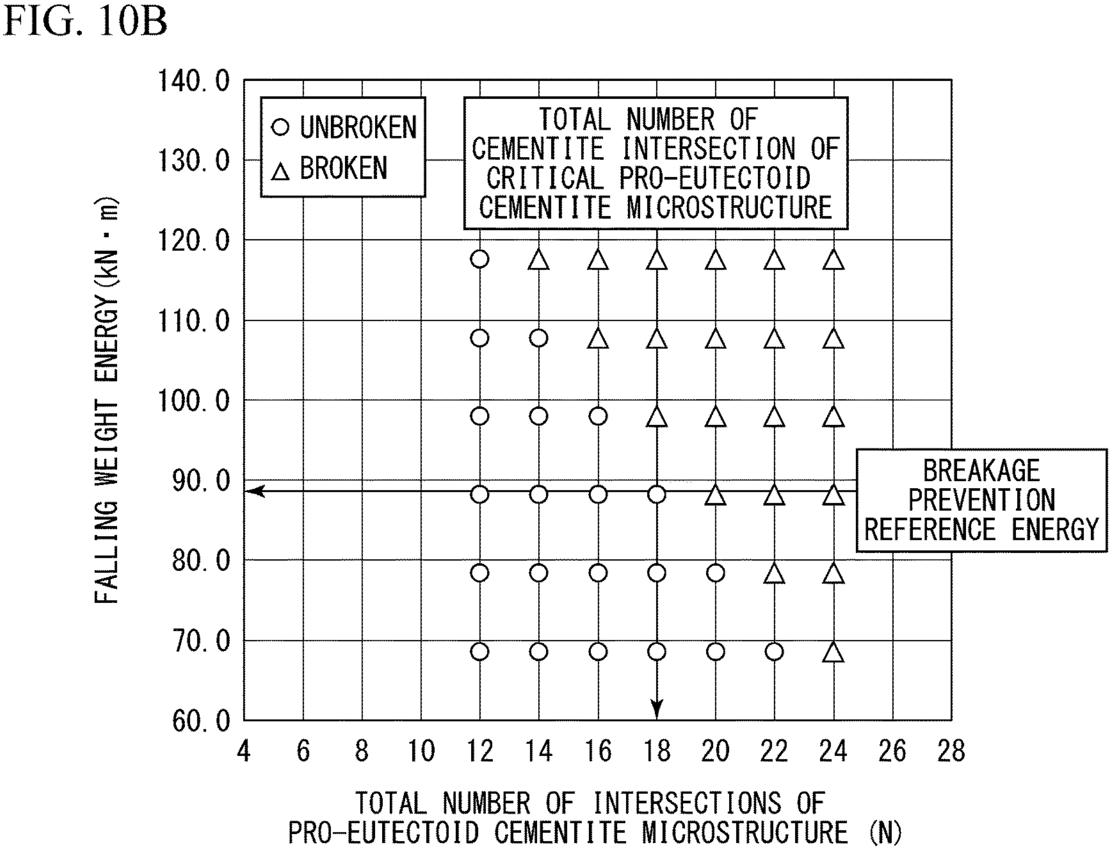
FIG. 10B is a graph showing the influence of the pro-eutectoid cementite structure on the breakage property in the welded joint portion having a HAZ width of 30 mm.
Figure 10C:
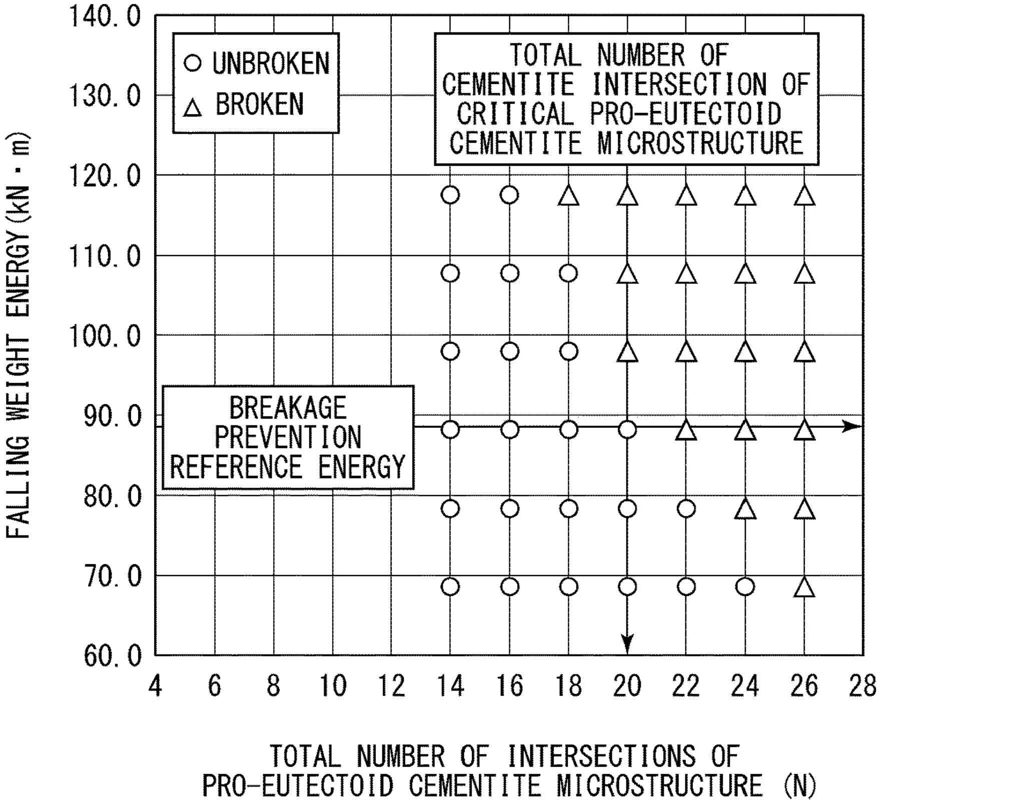
FIG. 10C is a graph showing the influence of the pro-eutectoid cementite structure on the breakage property in the welded joint portion having a HAZ width of 60 mm.

The test results are plotted with the horizontal axis representing the total number of intersections N of the pro-eutectoid cementite structure and the vertical axis representing the falling weight energy, and the results are shown in FIG. 10A to FIG. 10C. FIG. 10A shows evaluation results of various welded joint portions having a HAZ width of 10 mm, FIG. 10B shows evaluation results of various welded joint portions having a HAZ width of 30 mm, and FIG. 10C shows evaluation results of various welded joint portions having a HAZ width of 60 mm. In FIG. 10A to FIG. 10C, the type of data point is changed according to whether breakage has occurred. In addition, the "breakage prevention reference energy" described in FIG. 10A to FIG. 10C is an evaluation criterion of breakage resistance of the welded joint portion under severe track conditions. In this test, the breakage prevention reference energy was set to 88.2 kN. Then, the welded rail in which breakage did not occur in the welded joint portion even by the drop weight test with the falling weight energy of 88.2 kN was determined to be a welded rail excellent in breakage resistance of the welded joint portion even under severe track conditions. In addition, the absolute maximum value of the total number of intersections of the pro-eutectoid cementite structure in various welded joint portions that can withstand falling weight energy of 88.2 kN was regarded as the total number of cementite intersection of the critical pro-eutectoid cementite structure.

As a result, as shown in FIG. 10A to FIG. 10C, it has been confirmed that as the HAZ width decreases, the total number of intersections (N) of pro-eutectoid cementite structures capable of preventing breakage under severe track conditions, that is, the total number of intersections of critical pro-eutectoid cementite structures significantly decreases. Specifically, as shown in FIG. 10C, the total number of intersections of the critical pro-eutectoid cementite structure in the welded joint portion having a HAZ width of 60 mm was 20, on the other hand, as shown in FIG. 10B and FIG. 10A, the total number of intersections of the critical pro-eutectoid cementite structure in the welded joint portion having a HAZ width of 30 mm was 18, and the total number of intersections of the critical pro-eutectoid cementite structure in the welded joint portion having a HAZ width of 10 mm was 12.

Figure 11:
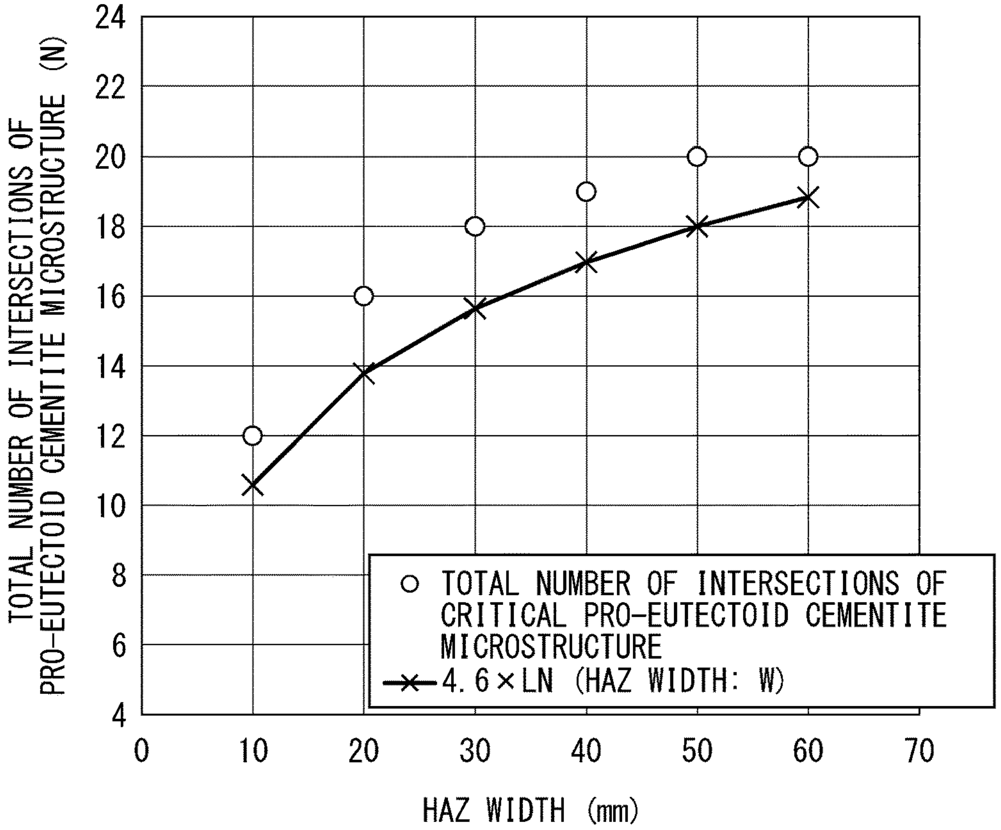
FIG. 11 is a graph showing the influence of the HAZ width and the critical pro-eutectoid cementite structure on the breakage property.

FIG. 11 shows the relationship between the HAZ width and the total number of cementite intersection in the critical pro-eutectoid cementite structure in the HAZ width of 10 to 60 mm in an organized manner. It can be seen that as the HAZ width decreases, the total number of intersections of critical pro-eutectoid cementite structures that can prevent breakage under severe track conditions significantly decreases. From this experimental result, it became clear that the total number of intersections of the critical pro-eutectoid cementite structure increases as the HAZ width is reduced in order to improve the service life of the welded joint portion, and accordingly, it becomes difficult to secure breakage resistance under severe track conditions.

Furthermore, in order to reliably prevent breakage under severe track conditions, the present inventors estimated the total number of intersections of critical pro-eutectoid cementite structures that prevent breakage at the welded joint portion for each HAZ width. As a result, it has been found that breakage of the welded joint portion can be reliably prevented by reliably controlling the total number of intersections (N) of the pro-eutectoid cementite structure to be equal to or less than the value calculated by the following formula 1 including the HAZ width (W). Here, "LN" in formula 1 means a natural logarithm, that is, a logarithm having a base of the Napier's Number e.

$$N \leq 4.6 \times \mathrm{LN}(W) \quad \text{formula 1}$$

From these results, the present inventors have found that it is necessary to control the formation amount of the pro-eutectoid cementite structure, that is, the total number of intersections of the pro-eutectoid cementite structure in order to further suppress breakage caused by a brittle crack generated from the head portion of the welded joint portion. Furthermore, the present inventors have found that it is desirable to control the total number of intersections of the pro-eutectoid cementite structure within a predetermined range defined according to the HAZ width in order to prevent breakage of the welded joint portion under severe track conditions.

The welded rail according to the present embodiment having excellent fatigue damage resistance and breakage resistance of the welded joint portion obtained based on the above findings is described in detail below. Hereinafter, the unit "% by mass" of the amount of the alloy component is simply described as "%".

(1) Reason for Limitation of Steel Chemical Compositions

The reasons why the chemical compositions of the rail portion of the welded rail of the present embodiment are limited is described in detail.

C is an element effective for promoting pearlitic transformation and ensuring wear resistance of the welded joint portion. When the amount of C is less than 0.85%, the minimum strength and wear resistance required for the welded joint portion cannot be maintained. On the other hand, when the amount of C exceeds 1.20%, a large amount of pro-eutectoid cementite structure is formed in the welded joint portion, and the breakage resistance of the welded joint portion is deteriorated. Therefore, the C content was limited to 0.85 to 1.20%. The C content is preferably 0.90% or more, 0.95% or more, or 1.00% or more. The C content is preferably 1.18% or less, 1.15% or less, or 1.10% or less. In order to stabilize the formation of the pearlite structure, the C content is desirably set to 0.95 to 1.10%.

Si is an element that is solid-solved in a ferrite having a pearlite structure, increases the hardness of the welded joint portion, and improves the wear resistance. However, when the amount of Si is less than 0.10%, these effects cannot be sufficiently expected. On the other hand, when the amount of Si exceeds 2.00%, the toughness of the pearlite structure decreases, and the breakage resistance of the welded joint portion decreases. Therefore, the Si content was limited to 0.10 to 2.00%. The Si content is preferably 0.20% or more, 0.30% or more, or 0.40% or more. The Si content is preferably 1.80% or less, 1.60% or less, or 1.50% or less. In order to stabilize the formation of the pearlite structure and improve the breakage resistance and the wear resistance of the welded joint portion, the Si content is desirably set to 0.30 to 1.50%.

Mn is an element that enhances hardenability of a welded rail, stabilizes pearlitic transformation, and at the same time, refines a lamellar interval of a pearlite structure, secures hardness of a welded joint portion, and further improves wear resistance. However, when the amount of Mn is less than 0.10%, the effect is small, and the wear resistance of the welded joint portion is deteriorated. On the other hand, when the amount of Mn exceeds 2.00%, an excessive amount of Mn promotes the Mn enrichment in the segregation portion, promotes the formation of pro-eutectoid cementite structure in the welded joint portion, and reduces the breakage resistance. Therefore, the Mn content was limited to 0.10 to 2.00%. The Mn content is preferably 0.20% or more, 0.30% or more, or 0.40% or more. The Mn content is preferably 1.80% or less, 1.60% or less, or 1.50% or less. In order to stabilize the formation of the pearlite structure and improve the wear resistance and breakage resistance of the welded joint portion, the Mn content is desirably set to 0.30 to 1.50%.

Cr is an element that increases the equilibrium transformation temperature, makes the lamellar interval of the pearlite structure refine by increasing the degree of supercooling, improves the hardness of the pearlite structure, and improves the wear resistance of the welded joint portion. However, when the amount of Cr is less than 0.10%, these effects cannot be sufficiently expected. On the other hand, when the amount of Cr is more than 1.50%, an excessive amount of Cr promotes Cr enrichment in the segregation portion, promotes the formation of pro-eutectoid cementite structure in the welded joint portion, and reduces the breakage resistance. Therefore, the Cr content was limited to 0.10 to 1.50%. The Cr content is preferably 0.15% or more, 0.20% or more, or 0.25% or more. The Cr content is preferably 1.40% or less, 1.30% or less, or 1.00% or less. In order to stabilize the formation of the pearlite structure and improve the wear resistance and damage resistance of the welded joint portion, the Cr content is desirably set to 0.20 to 1.00%.

P is an impurity element contained in steel. When the amount of P exceeds 0.0250%, the breakage resistance of the welded joint portion is deteriorated due to embrittlement of the pearlite structure. Therefore, the P content was limited to 0.0250% or less. The lower limit of the P content does not need to be limited, and may be, for example, 0%, but the lower limit of the P content may be about 0.0020% in consideration of the dephosphorization ability in refining. The P content is preferably 0.0025% or more, 0.0030% or more, or 0.0050% or more. The P content is preferably 0.0200% or less, 0.0150% or less, or 0.0120% or less.

S is an impurity element contained in steel. When the S content is more than 0.0250%, stress concentration is generated around a coarse MnS-based sulfide inclusion, and the breakage resistance of the welded joint portion is deteriorated. Therefore, the S content was limited to 0.0250% or less. The lower limit of the S content does not need to be limited, and may be, for example, 0%, but the lower limit of the S content may be about 0.0020% in consideration of the desulfurization ability in refining. The S content is preferably 0.0025% or more, 0.0030% or more, or 0.0050% or more. The S content is preferably 0.0200% or less, 0.0150% or less, or 0.0120% or less.

The remainder of the chemical compositions of the rail portion of the welded rail comprises iron and an impurity. The impurity means, for example, a raw material such as ore or scrap, or a component mixed due to various factors of manufacturing when a steel material is industrially manufactured, and is acceptable within a range not adversely affecting the welded rail according to the present embodiment.

Furthermore, for the object of improving wear resistance due to an increase in hardness of the welded joint portion, improving toughness, preventing softening of the heat affected zone, and controlling the cross section hardness distribution inside the head portion, the rail portion of the welded rail may contain one in a group or two or more in groups of elements of Mo in a group a, Co in a group b, B in a group c, Cu and Ni in a group d, V, Nb, and Ti in a group e, Mg, Ca, and REM in a group f, N in a group g, Zr in a group h, and Al in a group i as necessary. However, even if these elements are not contained in the rail portion, the welded rail according to the present embodiment can exert its effect, and thus the lower limit value of the amount of these elements is 0%.

Mo in the group a makes the lamellar interval of the pearlite structure refine by raising the equilibrium transformation point, and improves the hardness of the welded joint portion. Co in the group b is solid-solved in the ferrite having a pearlite structure, thereby making the lamellar structure immediately below the rolling surface of the welded joint portion refine and increasing the hardness of the worn surface. B in the group c reduces the cooling rate dependency of the pearlitic transformation temperature and makes the hardness distribution inside the head portion of the welded joint portion uniform. Cu and Ni in the group d is solid-solved in ferrite having a pearlite structure to increase the hardness of the welded joint portion and at the same time to improve the toughness. V, Nb, and Ti in the group e of improves the fatigue strength of the welded joint portion by precipitation hardening of a carbide, a nitride, and the like formed in the process of cooling the welded joint portion after welding the rail. In addition, V, Nb, and Ti in the group e stably generate a carbide, a nitride, and the like at the time of reheating the welded joint portion, and prevent softening of the heat affected zone. Mg, Ca, and REM in the group f finely disperse the MnS-based sulfide and reduce fatigue damage generated from an inclusion at the welded joint portion. N in the group g promotes precipitation of a carbide, a nitride, and the like of V in a cooling process of the welded joint portion after welding of the rail, and improves fatigue damage resistance of the welded joint portion. Zr in the group h increases the equiaxed crystal ratio of the solidified structure, thereby suppressing the formation of segregation zones at the central part of the cast piece and suppressing the enrichment of Mn and Cr in the segregation portion. Furthermore, Al in the group i improves the breakage resistance of the welded joint portion by deacidification.

<Group a>

Mo is an element that increases the equilibrium transformation temperature, makes the lamellar interval of the pearlite structure refine by increasing the degree of supercooling, improves the hardness of the pearlite structure, and improves the wear resistance of the welded joint portion. In order to obtain the above-described effect, the amount of Mo is preferably set to 0.01% or more. On the other hand, when the amount of Mo exceeds 0.50%, the pearlite structure may be embrittled, and the breakage resistance of the welded joint portion may be deteriorated. Therefore, the Mo content is desirably set to 0.01 to 0.50%. The Mo content is preferably 0.02% or more, 0.05% or more, or 0.10% or more. The Mo content is preferably 0.45% or less, 0.40% or less, or 0.30% or less.

<Group b>

Co is an element that is solid-solved in a ferrite having a pearlite structure, makes a lamellar structure of a pearlite structure immediately below a rolling surface where deformation occurs due to contact with a wheel refine, improves the hardness of the rolling surface, and improves the wear resistance of the welded joint portion. In order to obtain the above-described effect, the amount of Co is preferably set to 0.01% or more. On the other hand, when the amount of Co is more than 1.00%, the above effect is saturated, and refinement of the lamellar structure according to the Co content cannot be achieved. In addition, when the amount of Co exceeds 1.00%, economic efficiency is deteriorated due to an increase in alloy cost. Therefore, the Co content is desirably set to 0.01 to 1.00%. The Co content is preferably 0.02% or more, 0.05% or more, or 0.10% or more. The Co content is preferably 0.90% or less, 0.80% or less, or 0.60% or less.

<Group c>

B is an element that forms iron carbides ($Fe_{23}(CB)_6$) at an austenite grain boundary, reduces the cooling rate dependency of the pearlitic transformation temperature by the effect of promoting pearlitic transformation, makes the hardness distribution from the head surface to the inside of the welded joint portion uniform, and increases the life of the welded joint portion. In order to obtain the above-described effect, the amount of B is preferably set to 0.0001%. On the other hand, when the amount of B is more than 0.0050%, coarse iron carbide is formed, brittle fracture is promoted, and the breakage resistance of the welded joint portion may be deteriorated. Therefore, the B content is desirably set to 0.0001 to 0.0050%. The B content is preferably 0.0002% or more, 0.0005% or more, or 0.0010% or more. The B content is preferably 0.0040% or less, 0.0030% or less, or 0.0020% or less.

<Group d>

Cu is an element that is solid-solved in a ferrite having a pearlite structure, improves the hardness of the welded joint portion by solid solution strengthening, and improves the wear resistance of the welded joint portion. In order to obtain the above-described effect, the amount of Cu is preferably set to 0.01% or more. On the other hand, when the amount of Cu exceeds 1.00%, the pearlite structure may be embrittled, leading to deterioration of breakage resistance. Therefore, the Cu content is preferably 0.01 to 1.00%. The Cu content is preferably 0.02% or more, 0.05% or more, or 0.10% or more. The Cu content is preferably 0.90% or less, 0.80% or less, or 0.70% or less. The Cu content is desirably controlled to 0.40% or less.

Ni is an element that improves the toughness of the pearlite structure, and at the same time, improves the hardness of the welded joint portion by solid solution strengthening, and improves the wear resistance of the welded joint portion. Further, in the heat affected zone, Ni is an element that combines with Ti, precipitates as a fine intermetallic compound of $Ni_3Ti$, and suppresses softening of the welded joint portion by precipitation strengthening. When Cu is contained in the rail portion, Ni suppresses embrittlement of the grain boundary. In order to obtain the above-described effect, the amount of Ni is preferably 0.01% or more. When the amount of Ni is more than 1.00%, the pearlite structure may be embrittled, leading to deterioration of breakage resistance. Therefore, the Ni content is desirably set to 0.01 to 1.00%. The Ni content is preferably 0.02% or more, 0.05% or more, or 0.10% or more. The Ni content is preferably 0.90% or less, 0.80% or less, or 0.70% or less.

<Group e>

V is an element that increases the hardness (strength) of the pearlite structure and improves the fatigue damage resistance of the welded joint portion by precipitation hardening by a carbide/nitride of V formed in a cooling process after hot rolling. In order to obtain the above-described effect, the amount of V is preferably 0.01% or more. On the other hand, when the amount of V exceeds 0.20%, the number of fine carbides/nitrides of V is excessive, the pearlite structure is embrittled, and the fatigue damage resistance of the welded joint portion may be deteriorated. Therefore, the V content is desirably set to 0.01 to 0.20%. The V content is preferably 0.02% or more, 0.03% or more, or 0.05% or more. The V content is preferably 0.18% or less, 0.15% or less, or 0.10% or less.

Nb is an element that increases the hardness of the pearlite structure and improves the fatigue damage resistance of the welded joint portion by precipitation hardening by an Nb carbide and an Nb nitride formed in the cooling process after hot rolling. In the heat affected zone reheated to a temperature range equal to or lower than the Ac1 point, Nb is an element effective for stably forming an Nb carbide, an Nb nitride, and the like in a wide temperature range from a low temperature range to a high temperature range and preventing softening of the heat affected zone of the welded joint. In order to obtain the above-described effect, the amount of Nb is preferably set to 0.0010% or more. On the other hand, when the amount of Nb exceeds 0.0500%, precipitation hardening of a carbide, a nitride and the like of Nb becomes excessive, the pearlite structure itself embrittles, and the fatigue damage resistance of the welded joint portion may be deteriorated. Therefore, the Nb content is desirably set to 0.0010 to 0.0500%. The Nb content is preferably 0.0020% or more, 0.0025% or more, or 0.0030% or more. The Nb content is preferably 0.0400% or less, 0.0300% or less, or 0.0200% or less.

Ti is an element that increases the hardness of the pearlite structure and improves the fatigue damage resistance of the welded joint portion by precipitation hardening by a Ti carbide and a Ti nitride formed in a cooling process after hot rolling. In addition, Ti is an effective component for refining the structure of the heat affected zone reheated to the austenite region and preventing embrittlement of the welded joint portion by utilizing the fact that the Ti carbide and the Ti nitride precipitated in reheating after welding do not dissolve in the matrix. In order to obtain the above-described effect, the amount of Ti is preferably set to 0.0030% or more. On the other hand, when the amount of Ti exceeds 0.0500%, a coarse Ti carbide and Ti nitride are formed, and a fatigue crack is likely to be formed due to stress concentration around these, and the fatigue damage resistance of the welded joint portion may be deteriorated. Therefore, the Ti content is desirably set to 0.0020 to 0.0500%. The Ti content is preferably 0.0030% or more, 0.0035% or more, or 0.0040% or more. The Ti content is preferably 0.0400% or less, 0.0300% or less, or 0.0200% or less.

<Group f>

Mg is an element that combines with S to form fine sulfide (MgS), and the MgS finely disperses MnS, relaxes stress concentration around MnS, and improves fatigue damage resistance of a welded joint portion. In order to obtain the above-described effect, the amount of Mg is preferably set to 0.0005% or more. On the other hand, when the amount of Mg exceeds 0.0200%, a coarse oxide of Mg is formed, and a fatigue crack is easily formed due to stress concentration around the coarse oxide, and the fatigue damage resistance of the welded joint portion may be deteriorated. Therefore, the amount of Mg is desirably set to 0.0005 to 0.0200%. The Mg content is preferably 0.0010% or more, 0.0015% or more, or 0.0030% or more. The Mg content is preferably 0.0180% or less, 0.0150% or less, or 0.0120% or less.

Ca is an element that forms a sulfide (CaS) because of its strong bonding force with S, and CaS finely disperses MnS, relaxes stress concentration around MnS, and improves fatigue damage resistance of a welded joint portion. In order to obtain the above-described effect, the amount of Ca is preferably set to 0.0005% or more. On the other hand, when the amount of Ca exceeds 0.0200%, a coarse oxide of Ca is formed, and a fatigue crack is easily formed due to stress concentration around the coarse oxide, so that the fatigue damage resistance of the welded joint portion may be deteriorated. Therefore, the amount of Ca is desirably set to 0.0005 to 0.0200%. The Ca content is preferably 0.0010% or more, 0.0020% or more, or 0.0030% or more. The Ca content is preferably 0.0180% or less, 0.0150% or less, or 0.0120% or less.

REM is a deacidification and desulfurization element, generates oxysulfide ($REM_2O_2S$) of REM, and becomes a formation nucleus of Mn sulfide-based inclusions. Since oxysulfide ($REM_2O_2S$) has a high melting point, stretching of the Mn sulfide-based inclusion after rolling is suppressed. As a result, REM finely disperses MnS, relaxes stress concentration around MnS, and improves fatigue damage resistance of a welded joint portion. In order to obtain the above-described effect, the REM amount is preferably set to 0.0005% or more. On the other hand, when the amount of REM is more than 0.0500%, oxysulfide ($REM_2O_2S$) of coarse and hard REM is formed, and stress concentration around the oxysulfide easily generates a fatigue crack, so that fatigue damage resistance of a welded joint portion may be deteriorated. Therefore, the REM content is desirably set to 0.0005 to 0.0500%. The REM content is preferably 0.0010% or more, 0.0020% or more, or 0.0030% or more. The REM content is preferably 0.0400% or less, 0.0300% or less, or 0.0250% or less.

Note that REM is a total of 17 elements including Sc, Y, and La (lanthanoid). The "REM content" means the total value of the contents of all these REM elements. When the total content is within the above range, the same effect can be obtained regardless of whether the number of types of REM elements is one or two or more.

<Group g>

N is an impurity element mixed in steelmaking process. Even when degassing is actively performed, about 0.0020% of N remains in the steel. In normal rail refining, the N content is about 0.0030 to 0.0060%. In addition, N is an element effective for promoting pearlitic transformation from an austenite grain boundary by segregating at the austenite grain boundary, and improving the toughness of the welded joint portion mainly by refining the pearlite block size. When N and V are simultaneously contained, precipitation of carbonitride of V is promoted in a cooling process of a welded joint portion after welding of a rail, hardness of a pearlite structure is increased, and fatigue damage resistance of the welded joint portion is improved. In order to obtain the above-described effect, the amount of N is preferably set to 0.0050% or more. On the other hand, when the amount of N is more than 0.0200%, it is difficult to solid-solve N in steel, and bubbles as starting points of fatigue damage may be likely to be formed. Therefore, the N content is desirably set to 0.0020 to 0.0200%. The N content is preferably 0.0030% or more, 0.0040% or more, or 0.0080% or more. The N content is preferably 0.0180% or less, 0.0150% or less, or 0.0120% or less.

<Group h>

Zr is an element that forms a $ZrO_2$ inclusion having good lattice matching with γ-Fe, and thus, γ-Fe serves as a solidification nucleus of the high carbon rail steel which is a solidification primary phase, and suppresses the formation of a segregation band at the central part of the cast piece by increasing the equiaxed crystal ratio of the solidified structure. In order to obtain the above-described effect, the amount of Zr is preferably set to 0.0001% or more. On the other hand, when the amount of Zr is more than 0.0200%, a large amount of coarse Zr-based inclusions are formed, and due to stress concentration around the coarse inclusions, fatigue cracks are easily generated, and the fatigue damage resistance of the welded joint portion may be deteriorated. Therefore, the Zr content is desirably set to 0.0001 to 0.0200%. The Zr content is preferably 0.0010% or more, 0.0020% or more, or 0.0030% or more. The Zr content is preferably 0.0180% or less, 0.0150% or less, or 0.0120% or less.

<Group i>

Al is a component that functions as a deoxidizing material. In order to obtain the above-described effect, the amount of Al is preferably set to 0.0100% or more, and more preferably 0.500% or more. On the other hand, when the amount of Al is more than 1.00% or 1.000%, it is difficult to solid-solve Al in steel, coarse alumina-based inclusions are formed, fatigue cracks are likely to be formed from the coarse inclusions, and the fatigue damage resistance of the welded joint portion may be deteriorated. Furthermore, when the Al amount exceeds 1.000%, an oxide is formed during welding of the rail, and the weldability of the rail may be significantly deteriorated. Therefore, the Al content is desirably set to 0.0100 to 1.000%. The Al content is preferably 0.0200% or more, 0.0500% or more, or 0.1000% or more. The Al content is preferably 0.900% or less, 0.800% or less, or 0.700% or less.

The chemical compositions of the rail portion are measured in accordance with JIS G 0321:2017 "Product analysis and its tolerance for wrought steel material".

(2) Reason for Limitation of HAZ Width (W) of Welded Joint Portion

Next, the reason why the HAZ width (W) of the welded joint portion is limited to 60 mm or less in the present embodiment is described.

As shown in Table 1, as a result of the rail/wheel rolling test, when the HAZ width decreases, the unevenness generated in the welded joint portion decreases, the number of times of rolling repetition until fracture increases, and the service life of the welded joint portion is improved. Specifically, in the experiment described above, when the HAZ width exceeded 60 mm, the unevenness generated in the welded joint portion increased, and the number of repetitions until fracture was less than 2 million, and the acceptance criteria were not satisfied. In addition, when the HAZ width was in the range of 40 mm or more and 60 mm or less, the unevenness generated in the welded joint portion was reduced, the number of repetitions until fracture exceeded 2 million times, and the acceptance criteria were satisfied. Furthermore, when the HAZ width was 20 mm or more and less than 40 mm, the unevenness generated in the welded joint portion was further reduced, and the number of repetitions until fracture was in the range of 3 million to 4 million times. Furthermore, it has been found that when the HAZ width is 10 mm or more and less than 20 mm, the unevenness generated in the welded joint portion is further reduced, the welded joint portion is not fractured even when the number of repetitions is 4 million times, and the service life of the welded joint portion is further improved as the HAZ width is reduced.

Therefore, the HAZ width of the welded joint portion was limited to 60 mm or less. The HAZ width of the welded joint portion may be 55 mm or less, 50 mm or less, 40 mm or less, or 30 mm or less. The lower limit value of the HAZ width is not particularly limited, but may be, for example, 5 mm or more, 10 mm or more, or 15 mm or more. In order to stably improve the number of times of rolling repetition until fracture, it is desirable to control the HAZ width to a range of 10 to 30 mm.

The measurement method of the HAZ width is as follows. The hardness measurement target is a longitudinal direction cross section, that is, a section parallel to the longitudinal direction and the vertical direction of the welded rail 1 and passing through the center of the welded rail 1 in the width direction. In the longitudinal direction cross section, Vickers hardness measurement is continuously performed at a position 5 mm depth from the top portion outer surface 1211 of the welded joint portion 12 along the top portion outer surface 1211. The Vickers hardness measurement is performed in accordance with JIS Z 2244:2009 "Vickers hardness test-test method". The test force, that is, the force for pushing the indentator into the surface of the sample is 10 kgf. The measurement interval is 1 mm. As a result, a hardness distribution graph as exemplified in FIG. 3 is obtained. In the graph of the hardness distribution of the welded rail 1, there are two valleys of Vickers hardness. A place where the valley of the Vickers hardness is generated is the most softened portion. The interval between the two most softened portions is regarded as the HAZ width W.

(3) Reason for Limitation of Total Number of Intersections (N) of Pro-Eutectoid Cementite Structure in Pro-Eutectoid Cementite Structure Evaluation Region Next, the reason why the total number of intersections (N) of pro-eutectoid cementite structures intersecting respective orthogonal line segments of 100 μm in the pro-eutectoid cementite structure evaluation region C set in the welded joint portion of the welded rail according to the present embodiment is limited to 26 or less is described. Hereinafter, the total number of intersections of the pro-eutectoid cementite structure in the pro-eutectoid cementite structure evaluation region C set in the welded joint portion may be simply referred to as "the total number of intersections of the pro-eutectoid cementite structure in the welded joint portion".

As described above with reference to FIG. 6, the total number of intersection points of the pro-eutectoid cementite structure is the total number of intersections between a cross line arranged in the pro-eutectoid cementite evaluation region and the pro-eutectoid cementite structure in a cross section parallel to the longitudinal direction and the vertical direction of the welded rail and passing through the center in the width direction of the welded rail. As shown in FIG. 6, the cross line arranged in the pro-eutectoid cementite evaluation region is a cross line including two line segments having a length of 100 μm parallel to the longitudinal direction and the vertical direction of the rail. In consideration of variations, two orthogonal line segments having a length of 100 μm are described at 20 locations in the pro-eutectoid cementite evaluation region, the total number of intersections of the pro-eutectoid cementite structure is measured, and the average value of the total number of intersections in each photograph is regarded as the total number of intersections (N) of the pro-eutectoid cementite structure of the welded joint portion.

As shown in FIG. 8, when the total number of intersections of the pro-eutectoid cementite structure in the welded joint portion exceeds 26, breakage occurs in the welded joint portion in the drop weight test. Therefore, the total number of intersections of the pro-eutectoid cementite structure in the welded joint portion was limited to 26 or less. The reason for the selection of the pro-eutectoid cementite structure evaluation region C and the method for calculating the total number of intersections of the pro-eutectoid cementite structure are as described above. In order to stably suppress breakage of the welded joint portion, the total number of intersections of the pro-eutectoid cementite structure of the welded joint portion is desirably 24 or less, 23 or less, or 22 or less. Since the total number of intersections of the pro-eutectoid cementite structure in the welded joint portion is preferably as small as possible, the lower limit thereof is not particularly limited.

The method for measuring the total number of intersections of the pro-eutectoid cementite structure in the welded joint portion is as described in "Method for evaluating the pro-eutectoid cementite structure" with reference to the graph shown in FIG. 8.

(4) Reason for Limitation of Preferable Relationship Between HAZ Width (W) of Welded Joint Portion and Total Number of Intersections of Pro-Eutectoid Cementite Structure of Welded Joint Portion Next, the reason why it is preferable that in the welded rail according to the present embodiment, the HAZ width (W) of the welded joint portion and the total number of intersections (N) of the pro-eutectoid cementite structure satisfy the formula 1 is described.

$$N \leq 4.6 \times \mathrm{LN}(W) \qquad \text{formula 1}$$

The present inventors investigated the breakage resistance of the welded joint portion in more detail. Under the conditions that the total number of intersections (N) of the pro-eutectoid cementite structure was constant, the correlation between the HAZ width and the breakage resistance of the welded joint portion was investigated under the drop weight test conditions in which more severe track conditions were reproduced. As a result, as shown in FIG. 9, in a state where the total number of intersections (N) of the pro-eutectoid cementite structure is the same, there is a correlation between the HAZ width of the welded joint portion and the breakage property of the welded joint portion, and the falling weight energy causing breakage decreases as the HAZ width decreases. That is, the present inventors have found that the breakage resistance of the welded joint portion decreases as the HAZ width decreases. The present inventors have found that this decrease in the breakage property is caused by a decrease in the softened portion of the welded joint portion accompanying a decrease in the HAZ width, that is, a decrease in macroscopic ductility.

In addition, the present inventors investigated the breakage resistance of the welded joint portion that varies depending on the HAZ width. The correlation between the total number of intersections (N) of the pro-eutectoid cementite structure and the breakage resistance of the welded joint portion was investigated under the drop weight test conditions. As a result, as shown in FIG. 10A to FIG. 10C, it has been confirmed that as the HAZ width decreases, the total number of intersections (N) of pro-eutectoid cementite structures capable of preventing breakage under severe track conditions, that is, the total number of intersections of critical pro-eutectoid cementite structures significantly decreases.

The relationship between the HAZ width at a HAZ width of 10 to 60 mm and the total number of cementite intersection in the critical pro-eutectoid cementite structure is summarized and shown in FIG. 11. It was confirmed that as the HAZ width decreased, the total number of intersections of critical pro-eutectoid cementite structures capable of preventing breakage under severe track conditions significantly decreased.

Furthermore, in order to reliably prevent breakage under severe track conditions, the present inventors estimated the total number of intersections (N) of critical pro-eutectoid cementite structures that prevent breakage at the welded joint portion for each HAZ width. As a result, it was confirmed that breakage of the welded joint portion can be more reliably prevented by reliably controlling the total number of intersections (N) of the pro-eutectoid cementite structure to be equal to or less than the value calculated by the following formula 1 including the HAZ width (W). Here, "LN" in formula 1 means a natural logarithm, that is, a logarithm having a base of the Napier's Number e.

$$N \leq 4.6 \times \mathrm{LN}(W) \qquad \text{formula 1}$$

From these results, the present inventors have confirmed that it is preferable to control the upper limit of the total number of intersections of the pro-eutectoid cementite structure according to the HAZ width in order to prevent breakage under severe track conditions.

Next, a method for manufacturing a welded rail according to another aspect of the present invention is described. According to the method for manufacturing a welded rail according to the present embodiment, it is possible to suitably obtain a welded rail having excellent fatigue damage resistance and breakage resistance of the welded joint portion described above. However, the welded joint portion of the welded rail satisfying the above-described requirements is excellent in fatigue damage resistance and breakage resistance regardless of the manufacturing method. Therefore, the method for manufacturing the welded rail according to the present embodiment is not particularly limited. The manufacturing method described below does not limit the range of the welded rail according to the present embodiment, and should be understood as a desirable example of the manufacturing method.

In order to obtain a welded rail having excellent fatigue damage resistance and breakage resistance of the welded joint portion, it is preferable to suppress both (1) breakage starting from a fatigue crack generated from the base portion of the welded joint portion and (2) breakage starting from a brittle crack generated from the head portion of the welded joint portion. In order to suppress breakage starting from a fatigue crack generated from the base portion of the welded joint portion, it is effective to narrow the HAZ width in the welded joint portion. In order to suppress both breakage starting from a fatigue crack generated from the base portion of the welded joint portion and breakage starting from a brittle crack generated from the head portion of the welded joint portion, it is effective to suppress the total number of cementite intersection of the pro-eutectoid cementite structure in the welded joint portion.

Therefore, as a result of further studies by the present inventors, it has been found that both reduction of the HAZ width and suppression of the total number of cementite intersections in the pro-eutectoid cementite structure can be achieved by strictly controlling the flash butt welding conditions and the cooling rate of the welded joint portion after completion of welding. In addition, it has also been found that the total number of cementite intersections in the pro-eutectoid cementite structure can be more effectively suppressed by further strictly controlling the cooling rate of the welded joint portion.

The method for manufacturing a welded rail according to the present embodiment obtained based on the above findings includes: flash butt welding the rails to form a welded joint portion; and heat-treating the welded joint portion.

A method for manufacturing a rail to be used for a flash butt, that is, a base material rail serving as a material of a welded rail is not particularly limited. The HAZ width is controlled by a flash butt welding conditions to be described later. The state of cementite at the welded joint portion is controlled by heat treatment conditions after flash butt welding. The metallographic structure of the base material rail before welding is transformed to another structure by welding heat at the welded joint portion. Therefore, the metallographic structure of the base material rail before flash butt welding does not affect the HAZ width and the state of cementite of the welded joint portion.

A preferred example of the base material rail manufacturing method includes:

- casting a bloom having the chemical compositions described above;
- hot rolling the bloom at a rolling start temperature of 1000 to 1350° C. and a rolling finishing temperature of 750 to 1100° C.; and
- cooling a rail with a cooling start temperature of 700 to 900° C., a cooling stop temperature of 500 to 650° C., and an average cooling rate between the cooling start temperature and the cooling stop temperature of 1 to 20° C./sec. When the welded rail is manufactured using the obtained rail as a base material, wear resistance and breakage resistance of the rail portion are significantly improved.

When the flash butt welding of the rail is performed by a preheating flashing method including: initial flashing; preheating; late flashing; and upsetting, the number of times of preheating is set to 2 to 14, and the late flashing time is set to 10 to 30 sec, the average late flashing speed is set to 0.3 mm/sec or more, the late flashing speed immediately before the upsetting (for 3 sec) is set to 0.5 mm/sec or more, and the upset load is set to 50 kN or more.

When the flash butt welding of the rail is performed by a continuous flashing method including: flashing; and upsetting, the flashing time is set to 150 to 250 sec, and the flashing speed is set to 0.10 mm/sec or more.

Under these conditions, the end portions of the plurality of rails are flash butt welded to obtain a welded rail having a rail portion and a welded joint portion.

In the heat treatment after the flash butt welding, the welded joint portion of the welded rail is cooled in which the cooling is controlled so that the average cooling rate in the temperature range of 800 to 550° C. of the top portion outer surface of the welded joint portion at the welding center A is set to more than 1.5 to 3.5° C./sec, the average cooling rate CR1 in a temperature range of 800 to 550° C. of an outer surface of a top portion of a welded joint portion at a location 0.6 WX to 0.7 WX away from a welding center A is set to more than 1.5 to 3.5° C./sec, the average cooling rate CR2 in a temperature range of 550 to 450° C. of the top portion outer surface of the welded joint portion at a location 0.6 WX to 0.7 WX away from the welding center A is set to 0.2 to 1.5° C./sec, and cooling is controlled to cool the welded joint of the welded rail so that $CR2 \geq 2.0-0.5 \times CR1$ is satisfied. Hereinafter, these manufacture conditions are described in detail.

(5) Desirable Flash Butt Welding Conditions

First, desirable flash butt welding conditions in the method for manufacturing a welded rail according to the present embodiment is described. There are a preheating flashing method and a continuous flashing method for flash butt welding of rails. In the method for manufacturing a welded rail according to the present embodiment, any method can be adopted.

In the case of the preheating flashing method, the flash butt welding includes: initial flashing; preheating; late flashing; and upsetting.

The initial flashing is flashing which starts from a state where the material rail is at room temperature. In order to facilitate the contact of the welded surface in the subsequent preheating, in the initial flashing, flash is generated between the end surfaces (that is, the welded surface) of the pair of material rails, and the welded surface is adjusted perpendicular to the longitudinal direction of the rail. Further, in the initial flashing, the welded surface is heated by resistance heat generation and arc heat generation of the flash. The time for performing the initial flashing, that is, the initial flashing time is desirably 10 sec or more and 40 sec or less.

In the preheating, a large current is applied to the pair of material rails for a certain period of time in a state where the welded surfaces facing each other of the pair of material rails are forcibly brought into contact with each other, and the base material in the vicinity of the welded surface is heated by resistance heat generation. Thereafter, the pair of material rails is separated. The contact and separation of the welded surface are repeated one or more times. The number of times of preheating (contact and separation of the welded surface) is preferably two or more. The number of times of preheating is more preferably 4 times or more, and further preferably 10 times or more. On the other hand, from the viewpoint of reducing the HAZ width, the number of times of preheating is preferably 14 times or less, 13 times or less, or 12 times or less.

In the late flashing, first, a flash is partially generated between the welded surfaces facing each other, and the welded surface is heated by resistance heat generation and arc heat generation of the flash. Next, in the late flashing, the flash generated on a part of the welded surface is generated on the entire welded surface by increasing the flashing speed, and the entire welded surface is uniformly heated by resistance heat generation and arc heat generation of the flash. Further, in the late flashing, the oxide generated during the preheating is scattered and reduced by flash. The flashing speed is a speed at which the jigs holding the pair of material rails are brought close to each other.

When the time for performing the late flashing, that is, the late flashing time is long, the HAZ width of the welded joint portion increases. In addition, when the flashing speed in the late flashing, that is, the late flashing speed is increased, the heat distribution in the vicinity of the welded surface becomes steep, and as a result, the HAZ width of the welded joint portion is reduced. Therefore, the late flashing time is set to 10 sec or more and 30 sec or less. Furthermore, it is desirable that the average late flashing speed is 0.3 mm/sec or more or 0.4 mm/sec or more, and the late flashing speed immediately before the upsetting (for 3 sec) is 0.5 mm/sec or more. Here, the average late flashing speed is an average value of the flashing speed in the entire late flashing, and the late flashing speed immediately before the upsetting is an average value of the flashing speed in 3 seconds before the start of the upsetting. In order to reliably reduce the HAZ width of the welded joint portion, it is desirable that the erosion amount of the material rail in the late flashing, that is, the late flashing loss is 10 mm or more.

In the upsetting, after the entire welded surface is melted by the late flashing, the welded surfaces are rapidly brought into close contact with each other with a large force, most of the molten metal on the welded surface is discharged to the outside, and force and deformation are applied to a portion heated to a high temperature behind the welded surface, thereby forming a joint portion. That is, since the oxide formed during welding is discharged by the upsetting and is finely dispersed, it is possible to reduce the possibility of remaining on the joint surface as a defect that hinders bendability performance. In addition, discharging most of the molten metal to the outside contributes to a decrease in the HAZ width of the welded joint portion. In order to reliably reduce the HAZ width of the welded joint portion, it is desirable to set the upset load to 50 kN or more. More preferably, the upset load is 65 kN or more.

In the case of the continuous flashing method, flash butt welding does not include preheating, and includes: flashing; and upsetting. In the flashing, when the flashing time is long, the HAZ width of the welded joint portion increases. In addition, when the flashing speed is increased, the heat distribution in the vicinity of the welded surface becomes steep, and as a result, the HAZ width of the welded joint portion is reduced. Therefore, the flashing time is desirably 150 sec or more and 250 sec or less. The flashing speed is desirably 0.10 mm/sec or more. The upsetting in the case of the continuous flashing method may be performed under the same conditions as those of the upsetting in the case of the preheating flashing method described above. In order to reliably reduce the HAZ width of the welded joint portion, it is desirable to perform preheating by pulse flashing or the like before the flashing to reduce the flashing time and increase the flashing speed.

(6) Desirable Cooling Conditions after Flash Butt Welding

Desirable cooling conditions after flash butt welding will now be described. The cooling conditions after flash butt welding can be similarly controlled regardless of whether the flash butt welding is performed by a preheating flashing method or a continuous flashing method.

Figure 12:
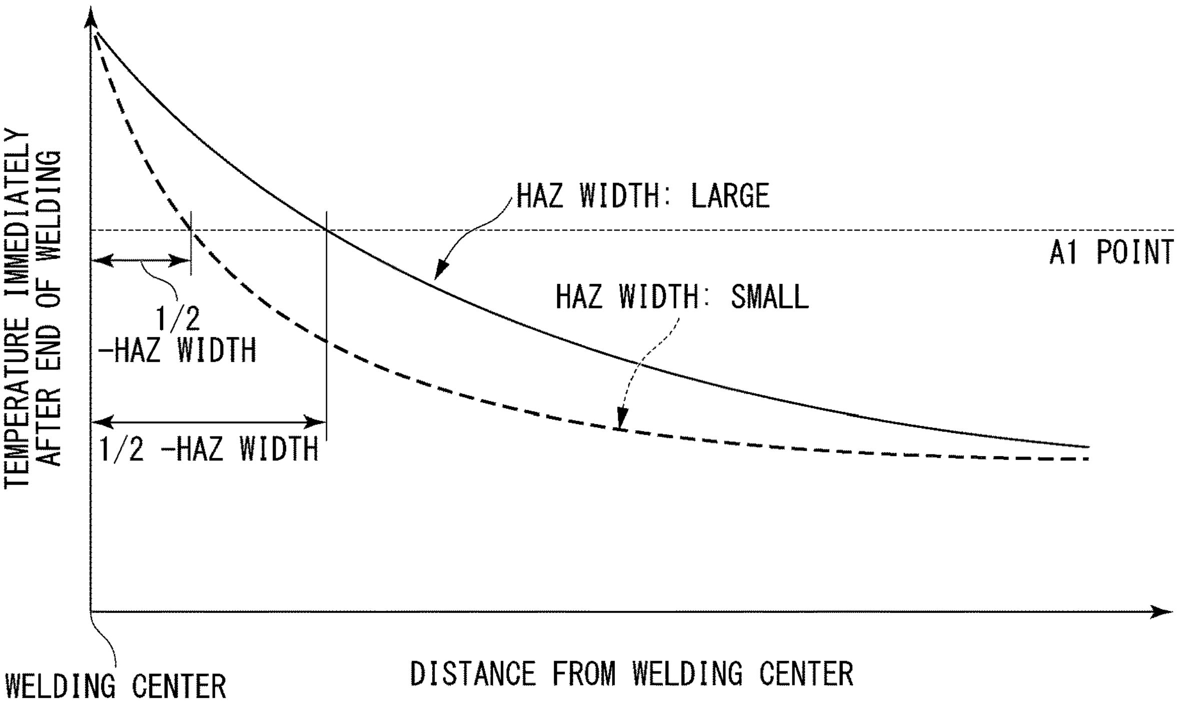
FIG. 12 is a schematic view of heat distribution in the vicinity of a welding center after flash butt welding.

The welded joint portion is heated to the austenite region by flash butt welding. Therefore, if the welded joint portion is not appropriately cooled, the hardness of the head portion of the welded joint portion decreases. Further, a pro-eutectoid cementite structure as a starting point of fracture is formed at the head portion of the welded joint portion. At this time, it is necessary to independently control the temperature at each of a location close to the welding center A and a location away from the welding center A. FIG. 12 is a schematic view of a temperature distribution in the welded joint portion after the flash butt welding is finished. In FIG. 12, a graph indicated by a solid line is a heat distribution immediately after the end of welding under a welding conditions where a welded joint portion having a large HAZ width is obtained, and a graph indicated by a broken line is a heat distribution immediately after the end of welding under a welding conditions where a welded joint portion having a small HAZ width is obtained. In flash butt welding, the welding center A is intensely heated, on the other hand, resistance heat generation hardly occurs at a location away from the welding center A. The temperature rise at a location away from the welding center A is caused by heat transfer from the welding center A. Therefore, after the flash butt welding is finished, a steep temperature gradient as shown in FIG. 12 is generated in the welded joint portion. In addition, in order to narrow the HAZ width, it is necessary to perform welding under a conditions (corresponding to the graph of the broken line) that causes a steeper temperature gradient than normal welding conditions (corresponding to the graph of the solid line). For this reason, in the heat treatment of the welded joint portion, it is required to consider the distance between the position where the temperature control is performed and the welding center A. In the method for manufacturing a welded rail according to the present embodiment, the cooling rate at the welding center A; and the cooling rate at location 0.6 WX to 0.7 WX away from welding center A are independently controlled. For example, as schematically shown in FIG. 15A, such heat treatment can be performed by optimizing the interval between the cooling gas ejection ports of the cooling device. The temperature of each location for controlling the cooling conditions may be measured, and the ejection position of the cooling medium may be optimized. On the other hand, in normal cooling, it is estimated that the cooling rate at the welding center A is different from the cooling rate at a location away from the welding center A due to the heat distribution as shown in FIG. 12.

First, it is desirable that the average cooling rate in the temperature range of 800 to 550° C. of the top portion outer surface 1211 of the welded joint portion 12 at the welding center A is set within the range of more than 1.5 to 3.5° C./sec. The average cooling rate in the temperature range of 800 to 550° C. is a value obtained by dividing 250° C. (that is, the difference between 800° C. and 550° C.) by the time required to lower the temperature of the location from 800° C. to 550° C. By setting the average cooling rate of the location in this temperature zone to more than 1.5° C./sec, the hardness of the welded joint portion can be secured, and the wear resistance of the top portion of the welded joint portion can be enhanced. In addition, when the average cooling rate of the location in this temperature zone exceeds 3.5° C./sec, the hardness of the welded joint portion becomes excessive, and the rolling contact fatigue damage resistance of the top portion of the welded joint portion decreases.

It is desirable that the temperature is controlled by measuring the top portion outer surface of the welded joint after welding with a radiation thermometer. The cooling rate can be controlled by adjusting the temperature and the elapsed time based on the temperature measurement.

In addition, the average cooling rate CR1 of the top portion outer surface 1211 of the welded joint portion in the temperature range of 800 to 550° C. at the position where the distance from the welding center A is 0.6 WX to 0.7 WX is set to a range of more than 1.5 to 3.5° C./sec. The average cooling rate CR1 in the temperature range of 800 to 550° C. is a value obtained by dividing 250° C. (that is, the difference between 800° C. and 550° C.) by the time required to lower the temperature of the location from 800° C. to 550° C. When the average cooling rate CR1 at the location in this temperature zone is 1.5° C./sec or less, the pro-eutectoid cementite structure in the pro-eutectoid cementite structure evaluation region C increases, the total number of cementite intersection (N) exceeds 26, and it becomes difficult to secure the minimum breakage resistance required as a welded joint portion of a welded rail. In addition, when the average cooling rate CR1 at the position in this temperature zone exceeds 3.5° C./sec, recuperation after cooling becomes excessive, it becomes difficult to control the average cooling rate CR2 in a temperature zone of lower than 550° C., the pro-eutectoid cementite structure increases due to an increase in temperature, and the total number of cementite intersection (N) of cementite of the pro-eutectoid cementite structure exceeds 26.

Furthermore, the average cooling rate CR2 in the temperature range of 550 to 450° C. of the top portion outer surface of the welded joint portion at the position where the distance from the welding center A is 0.6 WX to 0.7 WX is set to 0.2 to 1.5° C./sec. The average cooling rate CR2 of the location in the temperature range of 550 to 450° C. is a value obtained by dividing 100° C. (that is, the difference between 550° C. and 450° C.) by the time required to lower the temperature from 550° C. to 450° C. When the average cooling rate CR2 of the location in this temperature zone is 0.2° C./sec or less, the pro-eutectoid cementite structure of the head portion at the position of 0.6 WX to 0.7 WX increases, the total number of cementite intersection (N) of cementite of the pro-eutectoid cementite structure exceeds 26, and it becomes difficult to secure the minimum breakage resistance required as a welded joint portion of a welded rail. On the other hand, even when the average cooling rate CR2 at the location in this temperature zone exceeds 1.5° C./sec, there is no significant change in the total number of intersections (N) of the pro-eutectoid cementite structure, and the effect is saturated. Therefore, a preferable upper limit value of the average cooling rate CR2 was set to 1.5° C./sec.

The control of the cooling rate of the top portion outer surface at the welding center (A) is performed within a range of 800 to 550° C., whereas the control of the cooling rate of the top portion outer surface at positions of 0.6 WX to 0.7 WX is performed within a range of 800 to 450° C. This difference in the temperature range is caused by a difference in the object of the cooling rate control. The object of controlling the cooling rate on the top portion outer surface of the welding center (A) is to sufficiently cause pearlitic transformation to maintain hardness. On the other hand, the object of controlling the cooling rate on the top portion outer surface at positions of 0.6 WX to 0.7 WX is to suppress the formation of pro-eutectoid cementite structure.

Furthermore, in order to control the total number of cementite intersection (N) and the HAZ width (W) of the pro-eutectoid cementite structure to satisfy the relational expression of N≤4.6×LN (W) and further improve the breakage resistance of the welded joint portion, it is desirable to control the average cooling rate CR1 (800 to 550° C.) and the average cooling rate CR2 (550 to 450° C.) of the top portion outer surface 1211 at positions of 0.6 WX to 0.7 WX to a range satisfying the relational expression of CR2≥2.0-0.5×CR1. This is because, by controlling the average cooling rate (CR2) in a low temperature range, which is important for controlling the formation of a pro-eutectoid cementite structure after pearlitic transformation, the pearlitic transformation is sufficiently promoted, and the formation of a pro-eutectoid cementite structure is further suppressed.

Therefore, in order to drastically prevent breakage of the welded joint portion, in order to control the total number of cementite intersection (N) of the pro-eutectoid cementite structure and the HAZ width (W) to satisfy the relational expression of N≤4.6×LN (W), it is desirable to control the average cooling rate CR1 immediately after welding (800 to 550° C.) and the average cooling rate CR2 after welding (550 to 450° C.) within the range of CR2≥2.0-0.5×CR1, in addition to controlling the average cooling rate CR1 in cooling in a high temperature range immediately after welding and the average cooling rate CR2 in cooling in the subsequent low temperature range.

Figure 13:
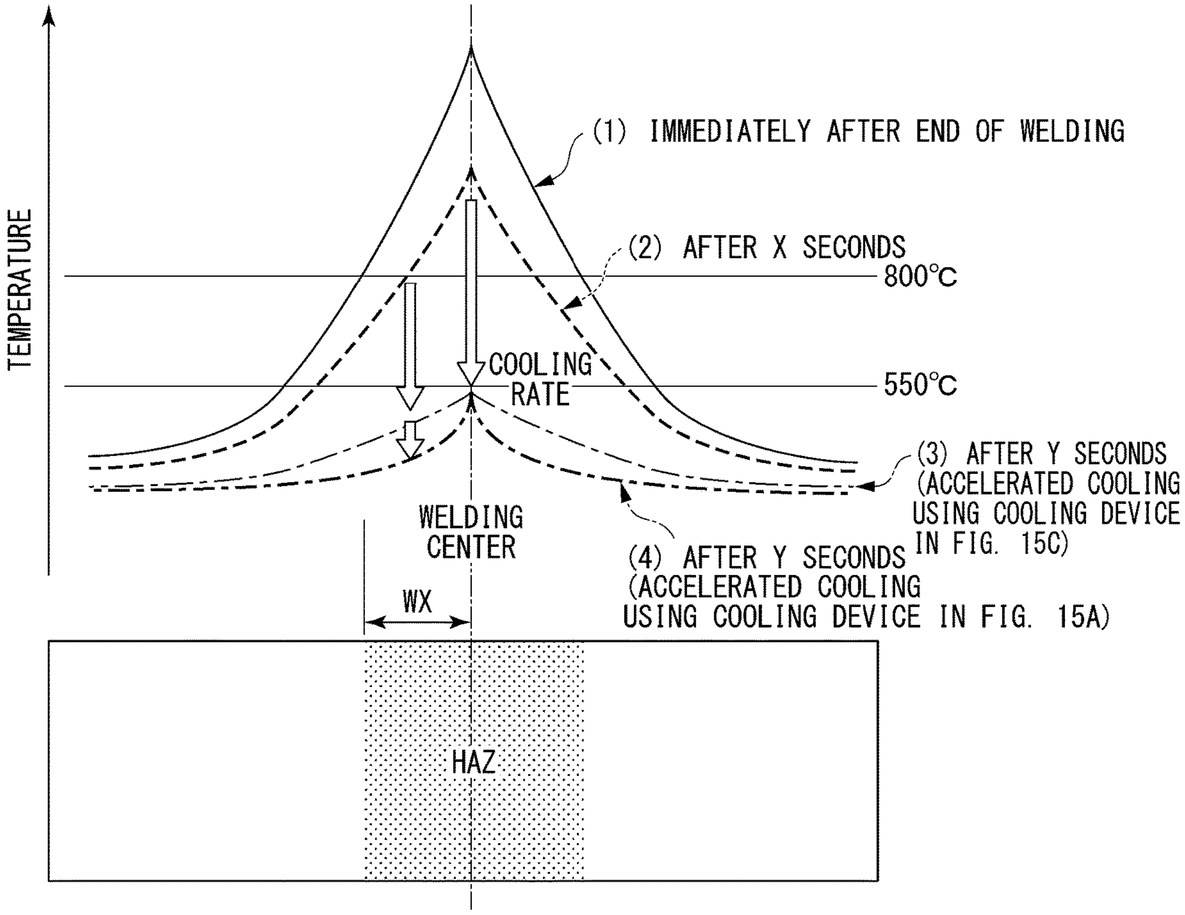
FIG. 13 is a schematic view of a temporal change in heat distribution in the vicinity of a welding center after flash butt welding.

In independently controlling the cooling rate at the welding center A and the cooling rate at a location 0.6 WX to 0.7 WX away from the welding center A, it is necessary to consider the heat distribution of the welding center and its peripheral portion after completion of welding. FIG. 13 is a schematic diagram illustrating a temporal change in heat distribution at a welding center and a peripheral portion thereof when accelerated cooling of the welded joint portion is performed. The meanings of the four heat distribution curves shown in FIG. 13 are as follows.

(Curve 1) Heat Distribution of Welded Joint Portion Immediately after Completion of Welding (Curve 2) Heat Distribution of Welded Joint Portion at Start of Accelerated Cooling after X Sec from Completion of Welding (Curve 3) Heat Distribution in Welded Joint Portion after Y Sec from Completion of Welding in Case where Accelerated Cooling is Performed Using Cooling Device in FIG. 15C after X Sec from Completion of Welding (Curve 4) Heat Distribution in Welded Joint Portion after Y Sec from Completion of Welding in Case where Accelerated Cooling is Performed Using Cooling Device in FIG. 15A after X Sec from Completion of Welding According to the temperature distribution immediately after completion of welding shown in the curve 1, the temperature at the welding center is close to the melting point of the steel. On the other hand, since heat transfer from the welded joint portion to the base material portion always occurs during welding and after completion of welding, the temperature decreases as the distance from the welding center increases. As indicated by curve 1 in FIG. 13, immediately after welding, a temperature at a location 0.6 WX to 0.7 WX away from welding center A is significantly lower than welding center A.

According to the temperature distribution at the start of the accelerated cooling (after elapse of X sec) indicated by the curve 2, the temperature of the welded joint portion is lower than the temperature immediately after the completion of the welding. However, the amount of temperature decrease is not uniform in the welded joint portion. The amount of temperature decrease at the welding center is larger than the amount of temperature decrease at a location 0.6 WX to 0.7 WX away from the welding center A.

According to the temperature distribution after the accelerated cooling using the cooling device of FIG. 15C shown in the curve 3, the cooling rate at the welding center is larger than the cooling rate at a location 0.6 WX to 0.7 WX away from the welding center A. In the cooling device of FIG. 15C, the plurality of cooling gas ejection ports 61 is uniformly arranged. Therefore, according to the cooling device of FIG. 15C, the cooling gas is uniformly jetted along the welded joint portion, but the cooling rate of the welded joint portion is not uniform.

According to the temperature distribution after the accelerated cooling using the cooling device of FIG. 15A shown in the curve 4, the temperature at the welding center is not different from that of the curve 3, but the temperature at a location 0.6 WX to 0.7 WX away from the welding center A is positioned below the curve 3. The cooling rate at the welding center is substantially equal to the cooling rate at a location 0.6 WX to 0.7 WX away from the welding center A. In the cooling device of FIG. 15A, the interval between the plurality of cooling gas ejection ports 61 is wide at the center portion and narrow at the end portion. Therefore, according to the cooling device of FIG. 15A, the injection amount of the cooling gas is particularly increased at a location 0.6 WX to 0.7 WX away from the welding center A. In order to relax the influence of the temperature difference caused by welding, it is necessary to increase the injection amount of the cooling gas at a location 0.6 WX to 0.7 WX away from the welding center A.

By comparing the curves 2 to 4 in FIG. 13, it is possible to understand the influence of the temperature difference between the welding center A and its peripheral portion immediately after completion of welding on the cooling rate.

Means for independently controlling the cooling rate at the welding center A and the cooling rate at a location 0.6 WX to 0.7 WX away from the welding center A are not particularly limited, but as described above, it is preferable to use a plurality of cylindrical cooling devices 6 as shown in FIG. 14A and FIG. 14B.

As illustrated in FIG. 15A and the like, the cooling device 6 is provided with a plurality of cooling gas ejection ports 61. The cooling device 6 is connected to the compressor via a cooling gas supply pipe (not illustrated). The cooling device 6 is arranged around the welded joint portion such that the cooling gas ejection port 61 faces the top portion outer surface 1211 of the welded joint portion, the rail top portion corner side outer surface 1114, and the head side portion outer surface 1213. The cooling device 6 is arranged such that the longitudinal direction coincides with the longitudinal direction of the welded rail. In addition, the longitudinal direction central part of the plurality of cylindrical cooling devices 6 is aligned with the welding center A. The welding center A and the HAZ can be cooled by spraying the cooling gas g to the welded joint portion using the cooling device 6. The cooling gas g is, for example, air.

The cooling rate can be controlled via the disposition and number of cooling gas ejection ports 61. As shown in FIG. 15A, it is most preferable that the cooling gas ejection ports 61 are arranged at wide intervals in the center in the longitudinal direction, and are disposed at narrow intervals in the vicinity of the end portion in the longitudinal direction (cementite control position). As a result, the cooling capacity at a location 0.6 WX to 0.7 WX away from the welding center A can be made higher than the cooling capacity at the welding center A.

In the cooling device 6 shown in FIG. 15C, the cooling gas ejection ports 61 are provided at equal intervals along the longitudinal direction. According to such a cooling device 6, the discharge amount of the cooling gas can be made uniform. However, as described above with reference to FIG. 13, when the discharge amount of the cooling gas is made uniform, the cooling rate of the welded joint portion is not uniform.

On the other hand, it is not preferable that the interval between the cooling gas ejection ports 61 is too wide at the center in the longitudinal direction. For example, in the cooling device 6 shown in FIG. 15B, the interval between the cooling gas ejection ports 61 at the center in the longitudinal direction is wider than that in the cooling device shown in FIG. 15A. According to the cooling device 6 shown in FIG. 15B, there is a possibility that the cooling rate of the welding center is insufficient.

In addition, it is not preferable that the interval between the cooling gas ejection ports 61 is too narrow in the vicinity of the end portion in the longitudinal direction. For example, in the cooling device 6 shown in FIG. 15D, the interval between the cooling gas ejection ports 61 in the vicinity of the end portion in the longitudinal direction is narrower than that in the cooling device shown in FIG. 15A. According to the cooling device 6 shown in FIG. 15D, there is a possibility that the cooling rate at a location 0.6 WX to 0.7 WX away from the welding center A becomes excessive. It is desirable to optimize the size and interval of the cooling gas ejection port 61 according to various conditions such as the flow rate of the cooling gas g and the shape of the welded rail.

In order to set the relationship between CR1 and CR2 within the above range, it is preferable to appropriately control the flow rate of the cooling gas.

The disposition of the cooling gas ejection port 61 in the cooling device 6 needs to be determined according to the HAZ width W of the welded joint portion where the cooling device 6 is used. For example, it is preferable that an interval between a location where the cooling gas ejection ports 61 are disposed sparsely and a location where the cooling gas ejection ports are arranged densely is approximately 0.6 WX to 0.7 WX. When such a cooling device 6 is disposed in the welded joint portion, a location where the cooling gas ejection ports 61 are sparsely disposed faces the welding center A, and a portion where the cooling gas ejection ports 61 are densely disposed faces a portion 0.6 WX to 0.7 WX away from the welding center A.

At the time when the welded joint portion is at a high temperature immediately after the end of welding, the most softened portion of the welded joint portion is not formed yet. However, in the welded joint portion of the welded rail having the same shape and the same component to which the same flash butt welding conditions is applied, the interval between the welding center and the most softened portion is substantially the same. In addition, the cooling conditions after completion of welding does not substantially affect the position of the most softened portion. Therefore, the position of the most softened portion can be easily estimated before cooling is started. The disposition of the cooling gas ejection port 61 of the cooling device 6 can be determined based on the estimated position of the most softened portion.

Other specific constitutions of the cooling device 6 are not particularly limited. For example, the size of the cooling device 6 along the longitudinal direction is not particularly limited, but is preferably within a range of 2.0 times or more and 3.0 times or less of the HAZ width. According to such a cooling device 6, it is possible to ensure cooling efficiency of the entire welded joint portion. The diameter of the cooling gas ejection port 61 of the cooling device 6 and the flow rate of the cooling gas are also not particularly limited. These constitutions can be appropriately changed according to an object to be welded or the like.

(7) Desirable Metallographic Structure of Welded Joint Portion

Next, a desirable metallographic structure of the welded joint portion in the present embodiment is described. The metallographic structure of the welded joint portion is not particularly limited as long as the above-described definition is satisfied, but the fatigue damage resistance and the breakage resistance of the welded joint portion of the welded rail are further improved by having the composition described below.

In the head portion of the welded joint portion in contact with the wheel, it is most important to ensure wear resistance. As a result of examining the relationship between the metallographic structure and the wear resistance, it has been confirmed that the pearlite structure is the best in order to secure the wear resistance of the head portion of the welded joint portion. Therefore, it is desirable that the head portion (region from the head top surface to a depth of ⅓ h) of the welded joint portion is mainly composed of a pearlite structure. The other sites may be a metallographic structure other than the pearlite structure as long as the strength, ductility, and toughness necessary for the welded rail can be secured.

EXAMPLES

The effect of one aspect of the present invention is described more specifically with reference to examples. However, the conditions in Examples are merely one condition example adopted to confirm the operability and effects of the present invention. The present invention is not limited to these conditions. The present invention can adopt various conditions as long as the object of the present invention is achieved without departing from the gist of the present invention.

Various rails having chemical compositions described in Table 2 were used as a material of a welded rail. The remainder of the chemical compositions described in Table 2 were iron and an impurity. The amount of the element not intentionally added was described as "-" in Table 2.

These rails were flash butt welded and then heat-treated to create various welded rails. Then, a rolling fatigue test and a drop weight test were performed on the welded joint portion of the welded rail. The heat treatment conditions were as described in Table 4. For reference, values outside the preferred range in Table 4 were underlined. The HAZ width (W) and the total number of intersections (N) of pro-eutectoid cementite in the welded joint portion were as described in Table 3. In Table 3, values outside the scope of the invention are underlined. The rolling fatigue test results and the drop weight test results of the welded joint portion were as described in Table 5.

The method for evaluating the pro-eutectoid cementite structure and the method for measuring the HAZ width were as described above. As apparent from the above measurement method, the total number of intersections of pro-eutectoid cementite is an integer of 0 or more. On the other hand, 4.6×LN (W) is not an integer. When comparing these magnitudes, the value of 4.6×LN (W) should not be rounded off to the nearest whole number. For example, when the total number of intersections of pro-eutectoid cementite is 10 and 4.6×LN (W) is 9.7, it is determined that the relationship of N≤4.6×LN (W) is not satisfied.

Other experimental conditions were as follows.

Rail Serving as Welding Base Material

Rail shape: 136 lbs (weight: 67 kg/m)

Hardness: 420 HV (head top surface)

Flash Butt Welding Conditions (Preheating Flashing Method)

In principle, flash butt welding was performed under the following welding conditions.

Initial flashing time: 15 sec

Number of times of preheating: 2 to 14 times

Late flashing time: 15 to 30 sec

Average late flashing speed: 0.3 to 1.0 mm/sec

Late flashing speed immediately before upsetting (for 3 sec): 0.5 to 3.0 mm/sec

Upset load: 65 to 85 KN

However, in Comparative Example 28, flash butt welding was performed under the following welding conditions.

Number of times of preheating: 16 times,

Average late flashing speed: 0.2 mm/sec

Late flashing speed immediately before upsetting (for 3 sec): 0.3 mm/sec

Other welding conditions: the same as described above

In Comparative Example 35, flash butt welding was performed under the following welding conditions.

Average late flashing speed: 0.1 mm/sec

Late flashing speed immediately before upsetting (for 3 sec): 0.2 mm/sec

Other welding conditions: the same as described above

Cooling Conditions

The cooling rate at the welding center A and the cooling rate at a location 0.6 WX to 0.7 WX away from the welding center A were independently controlled. The cooling rate was as shown in Table 4. The cooling unit was a cooling device 6 having a constitution as shown in FIG. 14A to FIG. 14B.

The cooling rate at a location 0.6 WX to 0.7 WX away from the welding center A shown in FIG. 5 tends to be lower than the cooling rate at the welding center. The disposition and interval of the cooling gas ejection ports in the cooling device were determined in consideration of this tendency.

For example, in Example 1, as schematically shown in FIG. 15A, a cooling device was used in which the interval between the cooling gas ejection ports was wide at the center portion in the longitudinal direction and the interval between the cooling gas ejection ports was narrow at both end portions in the longitudinal direction.

In Comparative Examples 28 and 35, as schematically shown in FIG. 15B, a cooling device in which the interval between the cooling gas ejection ports in the center portion in the longitudinal direction is wider than that in FIG. 15A was used. Therefore, in Comparative Examples 28 and 35, the cooling rate of the welding center A was insufficient.

In Comparative Examples 31 and 38, as schematically shown in FIG. 15C, a cooling device having uniform intervals between cooling gas ejection ports was used. Therefore, in Comparative Examples 31 and 38, the cooling rate at a location 0.6 WX to 0.7 WX away from the welding center A was insufficient.

In Comparative Example 32, as schematically shown in FIG. 15D, a cooling device in which an interval between the cooling gas ejection ports at both end portions in the longitudinal direction is narrower than that in FIG. 15A was used. Therefore, in Comparative Example 32, the cooling rate at a location 0.6 WX to 0.7 WX away from the welding center A was excessive.

Characteristics of Welded Joint Portion

Hardness of welding center: 390 to 440 HV

Hardness of most softened portion: 280 HV

Rail/wheel rolling fatigue test conditions

Tester: Rolling fatigue tester (see FIG. 4)

Shape of welded rail to be test piece: length of 2 m (welded joint portion is present at center portion in length direction)

Wheel: AAR type (diameter 920 mm)

Radial load: 300 KN

Thrust load: 50 KN

Base portion stress: 400 MPa (measured value measured using strain gauge at the initial stage of the test)

Lubrication: repeated lubrication with water and drying (That is, a cycle of applying water to the welded rail for a certain period of time and then stopping the supply of water to dry the water is repeated.)

Number of repetitions of load application using wheel: maximum 4 million times

Cumulative Passage Tonnage: up to 120 million tons

Evaluation Criteria for Rail/Wheel Rolling Fatigue Test

The number of repetitions of load application until fracture is less than 2 million: X (failed)

The number of repetitions of load application until fracture was 2 million or more and less than 3 million: C (pass)

The number of repetitions of load application until fracture was 3 million or more and less than 4 million: B (pass)

No fracture even when the number of repetitions of load application was 4 million: A (pass)

Drop Weight Test Conditions (See FIG. 7)

Attitude: The welded rail is supported at two points with the head portion on the lower side and the base portion on the upper side, and a falling weight is dropped to the base portion of the welded joint portion.

Span (interval between two support points): 1000 mm

Weight of Falling weight: 1000 kgf (9.8 kN)

Falling weight height (X): 3.0 m, and 9.0 m

Falling weight energy: 29.4 kN·m and 88.2 kN·m (breakage prevention reference energy)

Evaluation Criteria for Drop Weight Test

Broken at falling weight energy of 29.4 kN·m: X

Broken at falling weight energy of 88.2 kN·m: B

Unbroken at falling weight energy of 88.2 kN·m: A

TABLE 2

| | C | Si | Mn | P | S | Cr | Mo | Co | B | Cu | Ni | V | Nb |
|---|---|---|---|---|---|---|---|---|---|---|---|---|---|
| 1 | 1.05 | 0.80 | 0.80 | 0.0120 | 0.0120 | 0.30 | — | — | — | — | — | — | — |
| 2 | 1.20 | 0.40 | 1.00 | 0.0130 | 0.0150 | 0.40 | — | — | — | — | — | — | — |
| 3 | 0.85 | 0.40 | 1.00 | 0.0130 | 0.0150 | 0.40 | — | — | — | — | — | — | — |

TABLE 2-continued

| | | | | | | | | | | | | | |
|---|---|---|---|---|---|---|---|---|---|---|---|---|---|
| 4 | 1.00 | 2.00 | 0.40 | 0.0140 | 0.0170 | 0.80 | — | — | — | — | — | — | — |
| 5 | 1.00 | 0.10 | 0.40 | 0.0140 | 0.0170 | 0.80 | — | — | — | — | — | — | — |
| 6 | 0.95 | 1.20 | 2.00 | 0.0150 | 0.0140 | 0.30 | — | — | — | — | — | — | — |
| 7 | 0.95 | 1.20 | 0.10 | 0.0150 | 0.0140 | 0.30 | — | — | — | — | — | — | — |
| 8 | 1.10 | 0.60 | 0.60 | 0.0020 | 0.0120 | 0.90 | — | — | — | — | — | — | — |
| 9 | 1.05 | 1.40 | 0.50 | 0.0120 | 0.0020 | 0.25 | — | — | — | — | — | — | — |
| 10 | 1.00 | 0.50 | 1.20 | 0.0150 | 0.0130 | 1.50 | — | — | — | — | — | — | — |
| 11 | 1.00 | 0.50 | 1.20 | 0.0150 | 0.0130 | 0.10 | — | — | — | — | — | — | — |
| 12 | 1.10 | 0.60 | 0.80 | 0.0120 | 0.0180 | 0.60 | 0 50 | — | — | — | — | — | — |
| 13 | 1.05 | 0.50 | 1.00 | 0.0130 | 0.0160 | 0.50 | — | 1.00 | — | — | — | — | — |
| 14 | 1.00 | 0.40 | 1.20 | 0.0140 | 0.0140 | 0.80 | — | — | 0.0050 | — | — | — | — |
| 15 | 0.95 | 0.30 | 1.40 | 0.0150 | 0.0120 | 0.70 | — | — | — | 1.00 | — | — | — |
| 16 | 0.95 | 1.00 | 0.70 | 0.0200 | 0.0120 | 0.50 | — | — | — | — | 1.00 | — | — |
| 17 | 1.00 | 1.40 | 0 60 | 0.0190 | 0.0130 | 0.30 | — | — | — | — | — | 0.20 | — |
| 18 | 1.05 | 1.30 | 0.50 | 0.0180 | 0.0140 | 0.50 | — | — | — | — | — | — | 0.0500 |
| 19 | 1.10 | 1.20 | 0.40 | 0.0170 | 0.0150 | 0.80 | — | — | — | — | — | — | — |
| 20 | 1.10 | 0.40 | 1.40 | 0.0140 | 0.0240 | 0.70 | — | — | — | — | — | — | — |
| 21 | 1.05 | 0.50 | 1.30 | 0.0150 | 0.0220 | 0.40 | — | — | — | — | — | — | — |
| 22 | 1.00 | 0.60 | 1.20 | 0.0160 | 0.0200 | 0.70 | — | — | — | — | — | — | — |
| 23 | 0.95 | 0.70 | 1.10 | 0.0170 | 0.0180 | 0.80 | — | — | — | — | — | — | — |
| 24 | 0.95 | 0.90 | 0.80 | 0.0200 | 0.0200 | 0.90 | — | — | — | — | — | — | — |
| 25 | 1.00 | 0.80 | 1.00 | 0.0210 | 0.0190 | 0.80 | — | — | — | — | — | — | — |
| 26 | 1.10 | 0.70 | 1.20 | 0.0220 | 0.0180 | 0.50 | — | — | — | — | — | — | — |
| 27 | 1.05 | 0.60 | 1.40 | 0.0230 | 0.0170 | 0.50 | — | — | — | — | — | — | — |
| 28 | Same as No. 1 | | | | | | | | | | | | |
| 29 | Same as No. 1 | | | | | | | | | | | | |
| 30 | Same as No. 1 | | | | | | | | | | | | |
| 31 | Same as No. 1 | | | | | | | | | | | | |
| 32 | Same as No. 1 | | | | | | | | | | | | |
| 33 | Same as No. 1 | | | | | | | | | | | | |
| 34 | Same as No. 1 | | | | | | | | | | | | |
| 35 | Same as No. 1 | | | | | | | | | | | | |
| 36 | Same as No. 1 | | | | | | | | | | | | |
| 37 | Same as No. 1 | | | | | | | | | | | | |
| 38 | Same as No. 1 | | | | | | | | | | | | |
| 39 | Same as No. 1 | | | | | | | | | | | | |
| 40 | Same as No. 1 | | | | | | | | | | | | |

| | Ti | Mg | Ca | REM | N | Zr | Al |
|---|---|---|---|---|---|---|---|
| 1 | — | — | — | — | 0.0040 | — | 0.002 |
| 2 | — | — | — | — | 0.0040 | — | 0.002 |
| 3 | — | — | — | — | 0.0040 | — | 0.002 |
| 4 | — | — | — | — | 0.0030 | — | 0.003 |
| 5 | — | — | — | — | 0.0030 | — | 0.003 |
| 6 | — | — | — | — | 0.0050 | — | 0.002 |
| 7 | — | — | — | — | 0.0050 | — | 0.002 |
| 8 | — | — | — | — | 0.0060 | — | 0.004 |
| 9 | — | — | — | — | 0.0060 | — | 0.004 |
| 10 | — | — | — | — | 0.0040 | — | 0.003 |
| 11 | — | — | — | — | 0.0040 | — | 0.003 |
| 12 | — | — | — | — | 0.0050 | — | 0.002 |
| 13 | — | — | — | — | 0.0060 | — | 0.002 |
| 14 | — | — | — | — | 0.0050 | — | 0.002 |
| 15 | — | — | — | — | 0.0060 | — | 0.002 |
| 16 | — | — | — | — | 0.0030 | — | 0.004 |
| 17 | — | — | — | — | 0.0030 | — | 0.002 |
| 18 | — | — | — | — | 0.0040 | — | 0.003 |
| 19 | 0.0500 | — | — | — | 0.0060 | — | 0.002 |
| 20 | — | 0.0200 | — | — | 0.0050 | — | 0.002 |
| 21 | — | — | 0.0200 | — | 0.0040 | — | 0.002 |
| 22 | — | — | — | 0.0500 | 0.0030 | — | 0.002 |
| 23 | — | — | — | — | 0.0200 | — | 0.003 |
| 24 | — | — | — | — | 0.0020 | — | 0.003 |
| 25 | — | — | — | — | 0.0040 | 0.0200 | 0.004 |
| 26 | — | — | — | — | 0.0040 | — | 1.000 |
| 27 | — | — | — | — | 0.0030 | — | 0.001 |
| 28 | Same as No. 1 | | | | | | |
| 29 | Same as No. 1 | | | | | | |
| 30 | Same as No. 1 | | | | | | |
| 31 | Same as No. 1 | | | | | | |
| 32 | Same as No. 1 | | | | | | |
| 33 | Same as No. 1 | | | | | | |
| 34 | Same as No. 1 | | | | | | |
| 35 | Same as No. 1 | | | | | | |
| 36 | Same as No. 1 | | | | | | |
| 37 | Same as No. 1 | | | | | | |

TABLE 2-continued

| | |
|---|---|
| 38 | Same as No. 1 |
| 39 | Same as No. 1 |
| 40 | Same as No. 1 |

TABLE 3

| | HAZ width (W) (mm) | Total number of intersections (N) of pro-eutectoid cementite structure | 4.6 × LN (W) | N ≤ 4.6 × LN (W) |
|---|---|---|---|---|
| 1 | 18 | 13 | 13.3 | Satisfied |
| 2 | 30 | 15 | 15.6 | Satisfied |
| 3 | 30 | 15 | 15.6 | Satisfied |
| 4 | 25 | 13 | 14.8 | Satisfied |
| 5 | 25 | 13 | 14.8 | Satisfied |
| 6 | 22 | 12 | 14.2 | Satisfied |
| 7 | 22 | 12 | 14.2 | Satisfied |
| 8 | 10 | 6 | 10.6 | Satisfied |
| 9 | 10 | 6 | 10.6 | Satisfied |
| 10 | 15 | 10 | 12.5 | Satisfied |
| 11 | 15 | 10 | 12.5 | Satisfied |
| 12 | 30 | 13 | 15.6 | Satisfied |
| 13 | 25 | 12 | 14.8 | Satisfied |
| 14 | 18 | 11 | 13.3 | Satisfied |
| 15 | 15 | 8 | 12.5 | Satisfied |
| 16 | 15 | 5 | 12.5 | Satisfied |
| 17 | 10 | 4 | 10.6 | Satisfied |
| 18 | 18 | 11 | 13.3 | Satisfied |
| 19 | 25 | 10 | 14.8 | Satisfied |
| 20 | 25 | 8 | 14.8 | Satisfied |
| 21 | 30 | 12 | 15.6 | Satisfied |
| 22 | 30 | 10 | 15.6 | Satisfied |
| 23 | 25 | 8 | 14.8 | Satisfied |
| 24 | 25 | 7 | 14.8 | Satisfied |
| 25 | 23 | 5 | 14.4 | Satisfied |
| 26 | 25 | 6 | 14.8 | Satisfied |
| 27 | 25 | 7 | 14.8 | Satisfied |
| 28 | 80 | 19 | 20.2 | Satisfied |
| 29 | 60 | 14 | 18.8 | Satisfied |
| 30 | 10 | 8 | 10.6 | Satisfied |
| 31 | 25 | 28 | 14.8 | Not satisfied |
| 32 | 25 | 30 | 14.8 | Not satisfied |
| 33 | 25 | 14 | 14.8 | Satisfied |
| 34 | 25 | 4 | 14.8 | Satisfied |
| 35 | 80 | 24 | 20.2 | Not satisfied |
| 36 | 60 | 20 | 18.8 | Not satisfied |
| 37 | 10 | 13 | 10.6 | Not satisfied |
| 38 | 18 | 30 | 13.3 | Not satisfied |
| 39 | 18 | 26 | 13.3 | Not satisfied |
| 40 | 18 | 16 | 13.3 | Not satisfied |

TABLE 4

| | Average cooling rate of head top surface of welding center (° C./sec) | CR1 (° C./sec) | CR2 (° C./sec) | 2.0-0.5 × CR1 | CR2 ≥ 2.0-0.5 × CR1 |
|---|---|---|---|---|---|
| 1 | 1.8 | 1.8 | 1.2 | 1.1 | Satisfied |
| 2 | 3.3 | 3.2 | 0.5 | 0.4 | Satisfied |
| 3 | 3.3 | 3.2 | 0.5 | 0.4 | Satisfied |
| 4 | 3.0 | 2.8 | 0.7 | 0.6 | Satisfied |
| 5 | 3.0 | 2.8 | 0.7 | 0.6 | Satisfied |
| 6 | 2.0 | 1.9 | 1.2 | 1.1 | Satisfied |
| 7 | 2.0 | 1.9 | 1.2 | 1.1 | Satisfied |
| 8 | 1.6 | 1.7 | 1.3 | 1.2 | Satisfied |
| 9 | 1.6 | 1.7 | 1.3 | 1.2 | Satisfied |
| 10 | 1.8 | 1.9 | 1.2 | 1.1 | Satisfied |
| 11 | 1.8 | 1.9 | 1.2 | 1.1 | Satisfied |
| 12 | 3.2 | 3.0 | 0.7 | 0.5 | Satisfied |
| 13 | 3.1 | 2.8 | 0.7 | 0.6 | Satisfied |
| 14 | 2.1 | 1.9 | 1.2 | 1.1 | Satisfied |
| 15 | 1.9 | 2.0 | 1.1 | 1.0 | Satisfied |

TABLE 4-continued

| | Average cooling rate of head top surface of welding center (° C./sec) | CR1 (° C./sec) | CR2 (° C./sec) | 2.0-0.5 × CR1 | CR2 ≥ 2.0-0.5 × CR1 |
|---|---|---|---|---|---|
| 16 | 1.9 | 2.0 | 1.1 | 1.0 | Satisfied |
| 17 | 1.7 | 1.7 | 1.3 | 1.2 | Satisfied |
| 18 | 2.0 | 2.2 | 1.0 | 0.9 | Satisfied |
| 19 | 2.8 | 3.0 | 0.7 | 0.5 | Satisfied |
| 20 | 2.8 | 3.0 | 1.0 | 0.5 | Satisfied |
| 21 | 3.2 | 2.9 | 0.7 | 0.6 | Satisfied |
| 22 | 3.2 | 2.9 | 1.0 | 0.6 | Satisfied |
| 23 | 2.9 | 2.8 | 0.8 | 0.6 | Satisfied |
| 24 | 2.9 | 2.8 | 1.2 | 0.6 | Satisfied |
| 25 | 1.9 | 2.1 | 1.3 | 1.0 | Satisfied |
| 26 | 2.8 | 2.8 | 1.4 | 0.6 | Satisfied |
| 27 | 2.8 | 2.8 | 1.4 | 0.6 | Satisfied |
| 28 | 1.0 | 3.0 | 1.0 | 0.5 | Satisfied |
| 29 | 3.5 | 3.4 | 0.9 | 0.3 | Satisfied |
| 30 | 1.6 | 1.7 | 1.3 | 1.2 | Satisfied |
| 31 | 2.3 | 1.0 | 0.9 | 1.5 | Not satisfied |
| 32 | 2.3 | 3.6 | 0.1 | 0.2 | Not satisfied |
| 33 | 2.3 | 1.8 | 1.3 | 1.1 | Satisfied |
| 34 | 2.3 | 2.8 | 0.8 | 0.6 | Satisfied |
| 35 | 1.0 | 3.2 | 0.3 | 0.4 | Not satisfied |
| 36 | 3.3 | 3.4 | 0.2 | 0.3 | Not satisfied |
| 37 | 1.7 | 1.7 | 1.0 | 1.2 | Not satisfied |
| 38 | 3.0 | 0.8 | 0.2 | 1.6 | Not satisfied |
| 39 | 3.0 | 2.0 | 0.3 | 1.0 | Not satisfied |
| 40 | 3.0 | 2.8 | 0.4 | 0.6 | Not satisfied |

TABLE 5

| | Rolling fatigue test | Drop weight test |
|---|---|---|
| 1 | A | A |
| 2 | B | A |
| 3 | B | A |
| 4 | B | A |
| 5 | B | A |
| 6 | B | A |
| 7 | B | A |
| 8 | A | A |
| 9 | A | A |
| 10 | A | A |
| 11 | A | A |
| 12 | B | A |
| 13 | B | A |
| 14 | A | A |
| 15 | A | A |
| 16 | A | A |
| 17 | A | A |
| 18 | A | A |
| 19 | B | A |
| 20 | B | A |
| 21 | B | A |
| 22 | B | A |
| 23 | B | A |
| 24 | B | A |
| 25 | B | A |
| 26 | B | A |
| 27 | B | A |
| 28 | X | A |
| 29 | C | A |
| 30 | A | A |
| 31 | B | X |
| 32 | B | X |

TABLE 5-continued

| | Rolling fatigue test | Drop weight test |
|---|---|---|
| 33 | B | A |
| 34 | B | A |
| 35 | X | B |
| 36 | C | B |
| 37 | A | B |
| 38 | A | X |
| 39 | A | B |
| 40 | A | B |

In Comparative Example 28 and Comparative Example 35, since the flash butt welding conditions were inappropriate, the welded rails had an excessive HAZ width. In Comparative Example 28 and Comparative Example 35, the fatigue damage resistance of the welded joint portion was insufficient, and the rolling fatigue test results were failed.

Comparative Example 31 and Comparative Example 38 are welded rails in which the total number of intersections of the pro-eutectoid cementite structure is excessive because CR1 is too small. In Comparative Example 31 and Comparative Example 38, the breakage resistance of the welded joint portion was insufficient, and the drop weight test result was failure. In Comparative Example 32, since CR1 was too large, the recuperation heat after cooling was excessive, it was difficult to control the average cooling rate CR2 in a temperature zone of lower than 550° C., the pro-eutectoid cementite structure increased due to an increase in temperature, and the total number of cementite intersections (N) of the pro-eutectoid cementite structure exceeded 26. In Comparative Example 32, the breakage resistance of the welded joint portion was insufficient, and the drop weight test result was failure.

On the other hand, the welded joint portion of the welded rail in which the total number of intersections of the chemical composition, the HAZ width, and the pro-eutectoid cementite structure were within the invention range was excellent in fatigue damage resistance and breakage resistance, and both the rolling fatigue test result and the drop weight test result were good. In addition, the test results of the welded joint portion of the welded rail satisfying the relationship of N≤4.6×LN (W) were further favorable.

BRIEF DESCRIPTION OF THE REFERENCE SYMBOLS

1 Flash butt welded rail (welded rail)
11 Rail portion
111 Rail head portion
1111 Rail top portion outer surface
1112 Rail jaw lower portion
1113 Rail head side portion outer surface
1114 Rail top portion corner side outer surface 1114
112 Rail web portion
113 Rail base portion
12 Welded joint portion
121 Head portion (of welded joint portion)
1211 Top portion outer surface (of welded joint portion)
1212 Jaw lower portion (of welded joint portion)
1213 Head side portion outer surface (of welded joint portion)
1214 Top portion corner side outer surface (of welded joint portion)
122 Web portion (of welded joint portion)
123 Base portion (of welded joint portion)
12H Heat affected zone (HAZ)
A Welding center
2 Tie
3 Wheel
4 Motor
5 Load stabilizer
6 Cooling device
61 Cooling gas ejection port
g Cooling gas

What is claimed is:

1. A welded rail comprising:
a plurality of rail portions; and
a welded joint portion which joins the rail portion, wherein
the rail portion contains, as a chemical composition, in a unit mass %,
0.85 to 1.20% of C,
0.10 to 2.00% of Si,
0.10 to 2.00% of Mn,
0.10 to 1.50% of Cr,
0.0250% or less of P,
0.0250% or less of S,
0 to 0.50% of Mo,
0 to 1.00% of Co,
0 to 0.0050% of B,
0 to 1.00% of Cu,
0 to 1.00% of Ni,
0 to 0.20% of V,
0 to 0.0500% of Nb,
0 to 0.0500% of Ti,
0 to 0.0200% Mg,
0 to 0.0200% Ca,
0 to 0.0500% of REM,
0 to 0.0200% of N,
0 to 0.0200% of Zr, and
0 to 1.000% of Al,
the remainder includes Fe and impurities,
in a cross section parallel to a longitudinal direction and a vertical direction of the welded rail and passing through a center of the welded rail in a width direction, a HAZ width (W), which is a distance between two most softened portions formed on both sides of a welding center of the welded joint portion measured along the longitudinal direction of the welded rail, is 60 mm or less, and
an interval between the most softened portion and the welding center measured along the longitudinal direction in the cross section is defined as WX and a region where a distance from the welding center is 0.6 WX to 0.7 WX and a depth from a top portion outer surface is 2 to 5 mm is defined as a pro-eutectoid cementite structure evaluation region, and in the pro-eutectoid cementite structure evaluation region, a total number of intersections (N) of a pro-eutectoid cementite structure intersecting a cross line including two line segments having a length of 100 μm parallel to the longitudinal direction and the vertical direction is 26 or less.

2. The welded rail according to claim 1, wherein the HAZ width (W) of the welded joint portion and the total number of intersections (N) of the pro-eutectoid cementite structure further satisfy the following formula 1, $$N \leq 4.6 \times \mathrm{LN}(W) \quad \text{formula 1}$$

wherein "LN" in the formula 1 is a natural logarithm.

* * * * *